United States Patent
Ishikawa et al.

(10) Patent No.: US 9,684,129 B2
(45) Date of Patent: Jun. 20, 2017

(54) OPTICAL WAVEGUIDE DEVICE AND MODULE

(71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Takanori Ishikawa, Yokohama (JP); Tomoyo Shibazaki, Yokohama (JP); Mitsuru Nagano, Yokohama (JP); Masahiro Yanagisawa, Yokohama (JP); Hiroshi Terui, Yokohama (JP); Mikitaka Itoh, Atsugi (JP)

(73) Assignees: NTT Electronics Corporation, Yokohama-shi (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/669,348

(22) Filed: Mar. 26, 2015

(65) Prior Publication Data
US 2015/0205043 A1 Jul. 23, 2015

Related U.S. Application Data

(63) Continuation of application No. 13/511,118, filed as application No. PCT/JP2010/006913 on Nov. 26, 2010, now Pat. No. 9,020,307.

(30) Foreign Application Priority Data
Nov. 26, 2009 (JP) .................................. 2009-268814

(51) Int. Cl.
G02B 6/12 (2006.01)
G02B 6/24 (2006.01)
(Continued)

(52) U.S. Cl.
CPC ............... *G02B 6/243* (2013.01); *G02B 6/12* (2013.01); *G02B 6/124* (2013.01);
(Continued)

(58) Field of Classification Search
CPC ............. G02B 6/2552; G02B 6/12004; G02B 6/12007; G02B 6/1228; G02B 6/262; G02B 6/305
(Continued)

(56) References Cited

U.S. PATENT DOCUMENTS 5,121,182 A * 6/1992 Kuroda ................... H01L 27/15
257/14
6,480,639 B2 * 11/2002 Hashimoto .......... G02B 6/4246
257/544

(Continued)

FOREIGN PATENT DOCUMENTS

| CN | 200968996 | 10/2007 |
| CN | 101311759 | 11/2008 |

(Continued)

OTHER PUBLICATIONS

U.S. Appl. No. 13/511,118, Dec. 20, 2013, Office Action.
(Continued)

*Primary Examiner* — Kaveh C Kianni
*Assistant Examiner* — Hung Lam
(74) *Attorney, Agent, or Firm* — Workman Nydegger

(57) ABSTRACT

In a waveguide device, unnecessary optical power is appropriately terminated. According to an embodiment of the present invention, the waveguide device has a termination structure filled with a light blocking material to terminate light from a waveguide end. In the termination structure, a cladding and a core are removed to form a groove on an optical waveguide. The groove is filled with a material (light blocking material) that attenuates the intensity of light.

(Continued)

Thus, light input to the termination structure is attenuated by the light blocking material, suppressing crosstalk which possibly effects on other optical devices. Thus, such a termination structure can restrain crosstalk occurred in optical devices integrated in the same substrate and can also suppress crosstalk which possibly effects on any other optical device connected directly to the substrate.

12 Claims, 20 Drawing Sheets

(51) Int. Cl.
G02B 6/255 (2006.01)
G02B 6/122 (2006.01)
G02B 6/124 (2006.01)
G02B 6/30 (2006.01)

(52) U.S. Cl.
CPC ....... *G02B 6/12019* (2013.01); *G02B 6/1228* (2013.01); *G02B 6/2552* (2013.01); *G02B 6/30* (2013.01); *G02B 6/305* (2013.01); *G02B 2006/1215* (2013.01); *G02B 2006/12126* (2013.01); *G02B 2006/12142* (2013.01); *G02B 2006/12145* (2013.01); *G02B 2006/12195* (2013.01)

(58) Field of Classification Search
USPC ...... 385/14, 16, 24, 27, 37, 38, 43, 129–132
See application file for complete search history.

(56) References Cited

U.S. PATENT DOCUMENTS

| 7,974,504 | B2 | 7/2011 | Nagarajan et al. |
| 2001/0053260 | A1 | 12/2001 | Takizawa et al. |
| 2005/0123232 | A1* | 6/2005 | Piede .................. G02B 6/1228 385/14 |
| 2011/0064355 | A1 | 3/2011 | Soma et al. |
| 2011/0110624 | A1 | 5/2011 | Kamei et al. |

FOREIGN PATENT DOCUMENTS

| JP | 2003-270460 | 9/2003 |
| JP | 2004-037968 | 2/2004 |
| JP | 3755762 | 3/2006 |
| JP | 2006-235380 | 9/2006 |
| JP | 2006235380 | 9/2006 |
| JP | 4361030 | 11/2009 |
| JP | 2001-330746 | 11/2011 |
| WO | 2009/145199 | 3/2009 |

OTHER PUBLICATIONS

U.S. Appl. No. 13/511,118, Jul. 23, 2014, Office Action.
Yasuaki Hashizume et al., *Compact 32-Channel 2 x 2 Optical Switch Array Based on PLC Technology for OADM Systems,* ECOC2003, M03-5-4, pp. 2.
International Search Report issued Jan. 11, 2011, in PCT Application No. PCT/JP2010/006913, filed Nov. 26, 2010.
Chinese Office Action dated Jul. 25, 2013 from related Chinese application No. 201080053387.7.
Office Action issued on Oct. 24, 2016 in correspondence to Chinese Patent Application No. 201410697531.0.

* cited by examiner

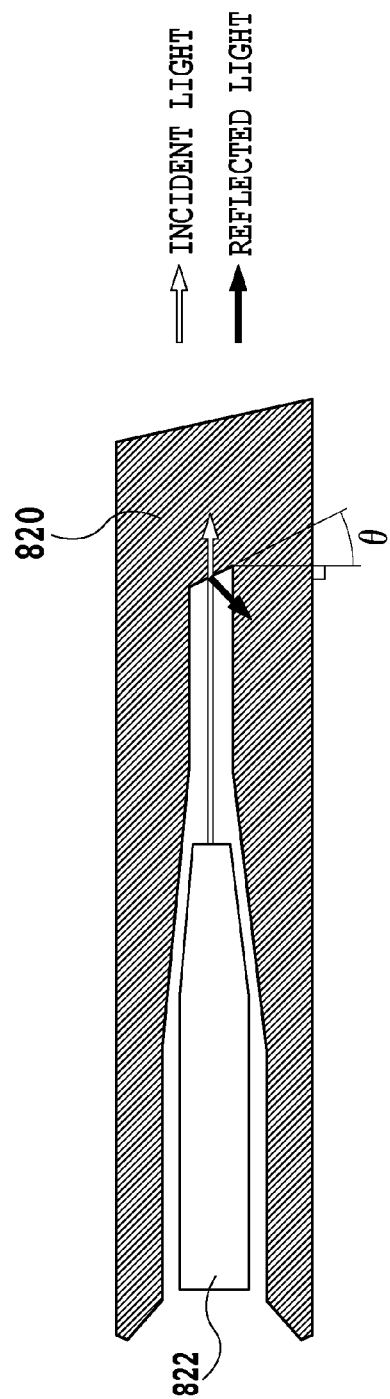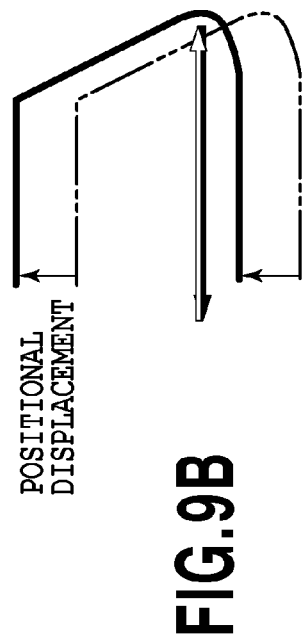
FIG.9A
FIG.9B

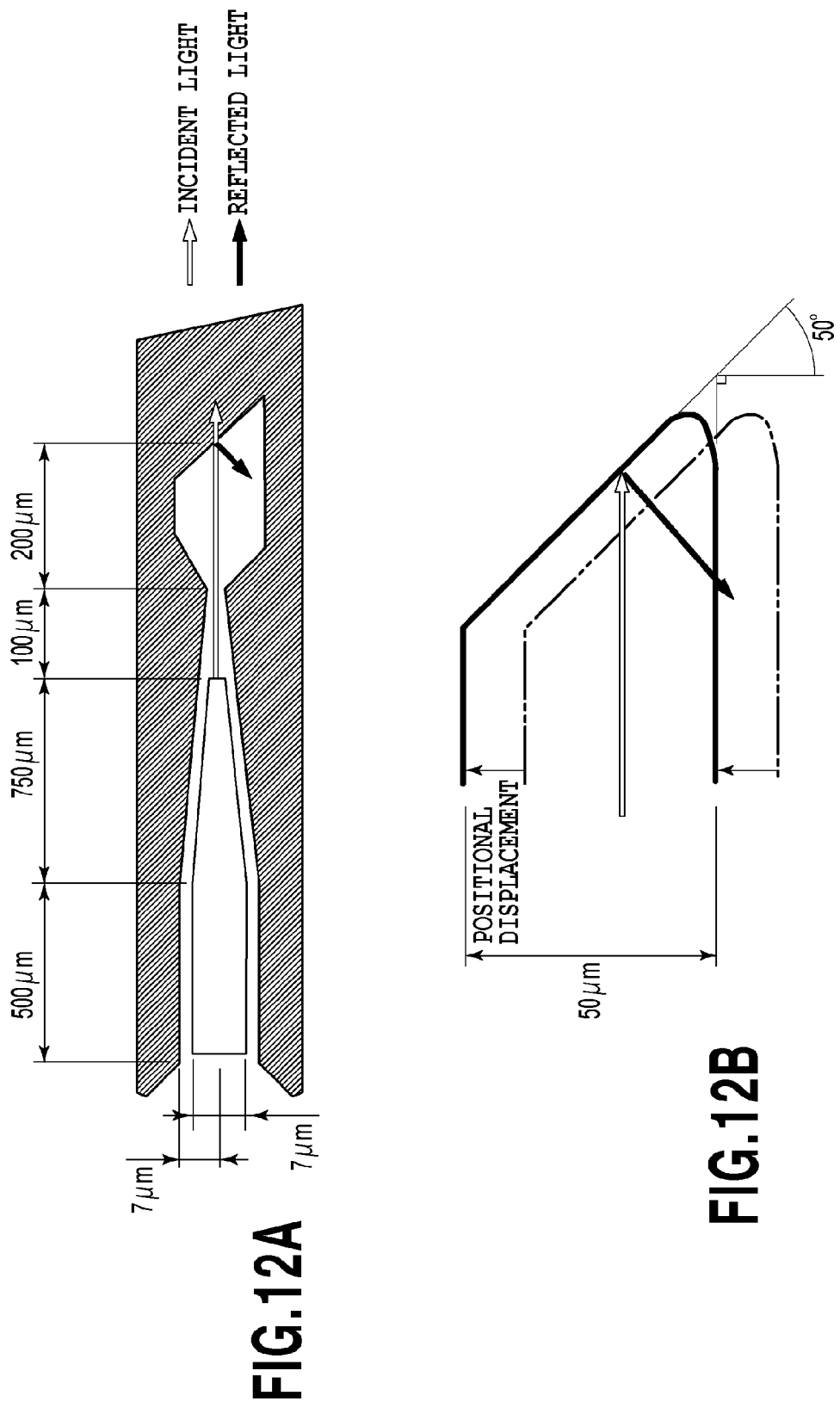

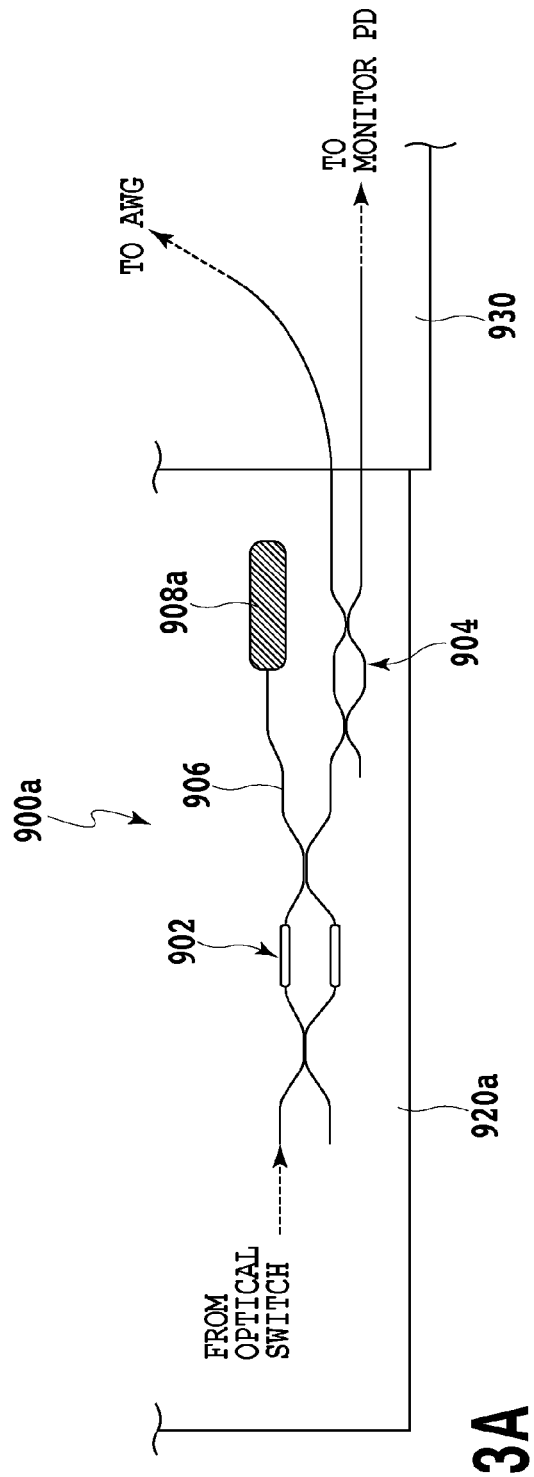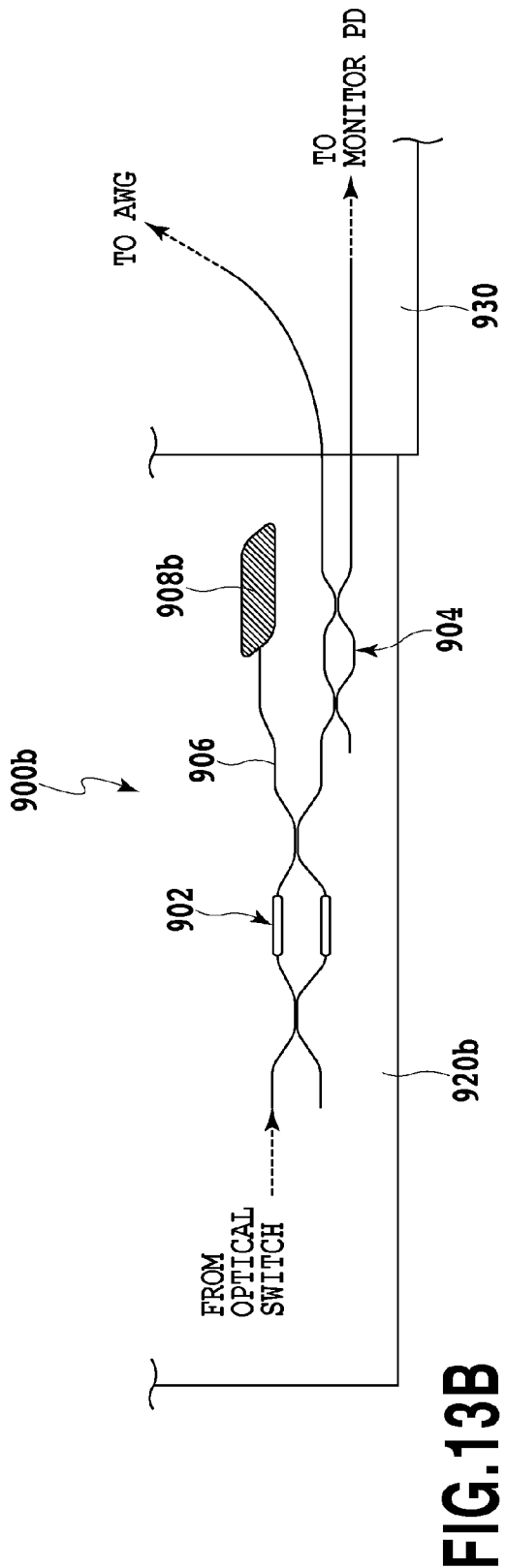
FIG.13A
FIG.13B

OPTICAL WAVEGUIDE DEVICE AND MODULE

CROSS REFERENCES TO RELATED APPLICATIONS

This application is a continuation application of U.S. patent application Ser. No. 13/511,118 filed on May 21, 2012, which claims priority to PCT Application No. PCT/JP2010/006913, filed on Nov. 26, 2010, which claims priority to Japanese Application No. JP 2009-268814, filed on Nov. 26, 2009, the contents of which are incorporated herein by specific reference.

TECHNICAL FIELD

The present invention relates to an optical device using a waveguide on a substrate. More specifically, the present invention relates to a technique to terminate a waveguide that is not connected to an input or output fiber, in any place in the substrate to attenuate the intensity of an optical signal propagating through the waveguide.

BACKGROUND ART

With the explosive spread of broadband communication at homes, network contents are being increasingly diversified. This results in increased communication traffic and improved communication service, leading to daily growing needs for increased capacities and speeds and enhanced functions of communication networks, which support the increased traffic and the improved communication service. In recent years, optical communication techniques have played an important role for meeting these needs. Conventional optical networks are mostly terrestrial communication systems that connect two points together based on optical-to-electrical or electrical-to-optical signal processing. However, importantly, the current communication system needs to be further developed into a mesh type in the future; in the mesh communication system, on all the networks including access networks, multiple points are connected together with only optical signals without via any electric-to-optical signal conversion. Such a communication system makes a variety of communication utilization forms available for users.

Waveguide devices are components which have played important roles in the optical communication system. Application based on the principle of optical interference has allowed implementation of various functions such as an optical branch coupler, a wavelength multiplexer/demultiplexer, an interleave filter, an optical switch, and a variable optical attenuator (VOA). These devices are of a waveguide type and are thus flexible in circuit design and can be easily increased in scale and highly integrated. Furthermore, a process for manufacturing semiconductor components such as LSIs has been used for the devices. The devices are thus highly expected to be suitable for mass production. Among the various waveguides put into practical use, which are formed using semiconductors or polymer materials, those which are made of silica on a silicon substrate are characterized by low loss, high stability, and appropriate connections to optical fibers, and are thus most commercialized.

Reconfigurable add/drop multiplexing (ROADM) using wavelength division multiplexing (WDM) signals is a system for optical communication system nodes configured by using these waveguide devices. This system node has a function to deliver and receive any WDM channel signal to and from a lower layer network and then to transmit all signals to adjacent nodes. The ROADM system is used mainly to configure a ring network. Optical devices required to implement this function are a wavelength multiplexing/demultiplexing filter that multiplexes/demultiplexes WDM signals of different wavelengths, an optical switch configured to switch a signal path, a VOA configured to adjust the intensity of signal light, an optical transceiver/receiver, and a light intensity monitor. In particular, the wavelength multiplexing/demultiplexing filter, the optical switch, the VOA, and the like can be implemented by waveguide devices.

In recent years, these waveguide devices have been able to be integrated into one module to provide a sophisticated optical device that fulfills the main functions of an ROADM system. Every effort is being made to introduce such optical devices into actual network systems. FIG. 18 shows an example of such a device and is a block diagram of a circuit in which wavelength multiplexing/demultiplexing filters (1404, 1406, and 1416), optical switches (1408-1 to 1408-N), VOAs (1410-1 to 1401-N), optical couplers (1402 and 1412-1 to 1412-N), and monitor PDs (Photo Detectors) (1414-1 to 1414-N) are integrated into one module 1400. In the example illustrated in FIG. 18, a WDM signal entering a main path through an input (In) is first branched by the tapping optical coupler 1402. Subsequently, one of the branched signal is separated into signals of individual wavelengths by the drop wavelength demultiplexing (DEMUX) filter 1404, and only the signals of the wavelengths for use in the lower layer network are detected. The other signal is also separated into signals of the individual wavelengths by the DEMUX filter 1406. The resultant signals pass through the 2×1 optical switches 1408-1 to 1408-N each of which selects either the main path signal or an add path signal that is transmitted from the lower layer network. The 2×1 optical switches select the signal from the add path only for the wavelength corresponding to the wavelength signal detected on the drop path as described above. Moreover, the signals of the respective wavelengths have the signal power levels thereof adjusted by the VOAs 1410-1 to 1410-N. Output signals from the VOAs 1410-1 to 1410-N are partly monitored by the tapping optical couplers 1412-1 to 1412-N and the monitor PD 1414-1 to 1414-N connected to output sides of the respective VOAs 1410-1 to 1410-N. The monitored signals are fed back to control the attenuation of the VOAs. The signals of the respective wavelengths with the levels thereof adjusted are converted into a WDM signal by a wavelength multiplexing (MUX) filter 1416. The WDM signal then exits the device through an output (out) for the main path.

According to the conventional art, these individual optical devices are mounted in a module by being connected together via optical fibers. For further reduced device size and power consumption and further increased scale, a major challenge is to further increase the degree of integration.

One of the proposed techniques adapted to meet the need for the increased degree of integration is a multichip integration technique. The multichip integration technique directly connects individual substrates of waveguide device together without any optical fibers, thus reducing the size of the waveguide device itself and the footprint where the waveguide devices occupy in the module. For example, in the configuration in FIG. 18, the wavelength multiplexing/demultiplexing filters 1406 and 1416 are fabricated into one waveguide device substrate 1420. Similarly, the optical switches 1408-1 to 1408-N, the VOAs 1410-1 to 1410-N, and the optical couplers 1412-1 to 1412-N are fabricated into one waveguide device substrate 1430. Subsequently, the substrates 1420 and 1430 are connected together without any optical fibers. Furthermore, the monitor PDs 1414-1 to 1414-N are not waveguide devices but can be connected to monitor ports of the optical couplers 1412-1 to 1412-N on an end face of the wavelength multiplexing/demultiplexing filter substrate 1420 or on an end face of the substrate 1430 for the optical switches without via any optical fibers. The present technique enables a reduction in the length of optical fibers used in the module 1400 and in the number of elements used to connect the substrates 1420 and 1430 together. This leads to the reduced footprint in the module and the increased degree of integration of devices. In this case, the VOAs function to suppress a signal power level deviation among the channels by attenuating the passing signal lights to adjust their optical levels.

FIG. 19A shows the most basic configuration of a VOA as a waveguide device. The VOA 1500 is a Mach Zehnder interferometer (MZI)-type optical device including two directional couplers 1504 and 1508 that branch and combine optical signals and arm waveguides 1506a and 1506b with thin film heaters 1512a and 1512b formed thereon. An optical signal entering the VOA 1500 through a port 1502a is branched into two signals by the directional coupler 1504. The resultant signals propagate through the arm waveguides 1506a and 1506b, respectively, and are combined together again by the directional coupler 1508. At this time, when one of the thin film heaters 1512a and 1512b is supplied with electricity through an electrode pad 1516 or 1518, a phase difference occurs between the arm waveguides 1506a and 1506b. Then, based on a phase relationship in the directional coupler 1508, the intensity of an optical signal output to a port 1510a or 1510b changes. When the phase difference is 0, 100% of the optical signal exits to the port 1510b. When the phase difference is π, 100% of the optical signal exits to the port 1510a. The device can be functioned as a VOA by utilizing this phenomenon to adjust the phase difference by controlling the supply of electricity to the thin film heaters in an analog manner. FIG. 19B is a cross-sectional view taken along line XIXB-XIXB in FIG. 19A. An optical waveguide is fabricated on a silicon substrate 1520 and includes a cladding 1522 which is formed of silica glass and a rectangular core 1524 which is covered with the cladding 1522. Heat insulation grooves 1514 are formed on the respective sides of each arm waveguide by removing the cladding along the waveguide using an etching technique. The heat insulation grooves 1514 enable a reduction in power required for switching or attenuation. Here, according to the principle of MZI interference, to achieve a sufficient extinction ratio or optical attenuation even if an error occurs in a coupling rate as a result of a production error in the optical couplers, a path from the port 1502a to the port 1510b or a path from the port 1502b to the port 1510a (cross path) is commonly used as a main signal path. Moreover, with polarization dependence of power consumption or thermooptic effects being taken into account, it is most common to block optical signals or to make the device have the maximum attenuation when no electricity is conducted through the thin film heaters 1512a and 1512b. To achieve this, an appropriate difference in an optical distance over which optical signals propagate, that is, in an optical path length (optical path length difference) needs to be designed between the arm waveguides 1506a and 1506b.

The optical attenuation operation in the VOA composed of an MZI as a basic element, including the two optical waveguides attenuates the optical level of the main port (an output waveguide connected to an optical fiber or another waveguide device) and allows unnecessary optical power (which results from the attenuation) to be output to the other port (dummy port). For example, in an MZI VOA using a cross path as a main signal path, if the port 1502a in FIG. 19A is used as an input, the port 1510b is used as a main port, and the port 1510a is used as a dummy port. According to the conventional techniques, in general, the unnecessary optical power guided to the dummy port propagates to the output end face of the waveguide device substrate, where the optical power is directly radiated to the air.

CITATION LIST

Patent Literature

PTL1: Japanese Patent No. 3755762

Non Patent Literature

NPL1: Y. Hashizume, et. al., "Compact 32-channel 2×2 optical switch array based on PLC technology for OADM systems", ECOC2003, M03-5-4

SUMMARY OF INVENTION

Technical Problem

However, it has been found that a problem may occur in an implementation of the multichip integration technique. For example, as shown in FIG. 20, the integration in which a waveguide device substrate 1608 with an arrayed waveguide grating (AWG) and a monitor PD are connected directly to a 1606 including a VOA 1602 and a tapping optical coupler 1604. That is, a part of unnecessary optical power exited form the VOA 1602 and radiated from the end face of the waveguide device substrate 1606 is coupled to an optical waveguide 1610 connecting to the tapping optical coupler 1604 located at an output side of the VOA 1602. This causes an inaccuracy in branching ratio or crosstalk, thus degrading circuit characteristics. Furthermore, various types of crosstalk may similarly occur in the succeeding AWG and monitor PD (not shown in the drawings), also degrading the circuit characteristics.

Moreover, even an implementation using normal optical fiber connections instead of the multichip integration technique has been found to possibly cause crosstalk problem as follows. The density of optical waveguides arranged at the end face of the waveguide device substrate increases significantly with increase in the degree of integration. Thus, propagating unnecessary optical power may couple to the main path or unnecessary optical power radiated from the end face may couple to an optical fiber, causing crosstalk.

Thus, for waveguide devices, an appropriate termination process for unnecessary optical power has been an important challenge.

The present invention is intended for a waveguide device that is terminated at any position on the substrate without radiating any unnecessary optical power to suppress crosstalk to optical fibers or other waveguide devices.

Solution to Problem

To accomplish such an object, a waveguide device according to an embodiment of the present invention includes a termination structure filled with a light blocking material to terminate light input from a waveguide end, and wherein the termination structure is configured to have an angle of incidence inclined from light input from the waveguide end, the waveguide end includes a taper portion with a waveguide width decreasing toward a terminal, and the termination structure surrounds the waveguide end and is located in proximity to or in contact with the taper portion, and a width of the termination structure at a plane located opposite the terminal of the waveguide end being larger than a width of the termination structure at the terminal of the waveguide end.

The taper portion according to the embodiment of the present invention has an adiabatic transition structure.

Furthermore, a waveguide device according to an embodiment of the present invention includes a termination structure filled with a light blocking material in order to terminate light input from a waveguide end, and wherein the termination structure is configured to have an angle of incidence inclined to light input from the waveguide end, the waveguide end includes a taper portion with a waveguide width decreasing toward a terminal, and the termination structure surrounds the waveguide end and is located in proximity to or in contact with the taper portion, and the taper portion has an adiabatic transition structure.

The incidence angle according to the embodiment of the present invention is equal to or larger than a Brewster's angle.

The light blocking material according to the embodiment of the present invention includes a material that absorbs or scatters light input from the waveguide end.

The waveguide device according to the embodiment of the present invention includes at least one of a Mach Zehnder optical switch, a variable attenuator, an optical splitter, and an arrayed waveguide grating.

Furthermore, a module according to an embodiment of the present invention is obtained by multichip integration using waveguide devices as described above.

Advantageous Effects of Invention

According to the present invention, in a waveguide device, a cladding and a core are removed at any position on a substrate to form a groove on an optical waveguide. The groove is filled with a material (light blocking material) that attenuates the intensity of light, to terminate the optical waveguide. Thus, light input to the termination structure is attenuated by the light blocking material, suppressing crosstalk which possibly effects on other optical devices. Thus, the present invention can restrain crosstalk occurred in optical devices integrated in the same substrate and can also suppress crosstalk which possibly effects on any other optical device connected directly to the substrate, for example, any other waveguide device or light receiving or emitting element. This is very effective in implementing an optical device with a high degree of integration and is expected to contribute significantly to developing a large-capacity optical communication network that requires control of various optical signals.

BRIEF DESCRIPTION OF DRAWINGS

FIG. 9A is a diagram showing a termination structure surrounding an optical waveguide according to an eighth embodiment of the present invention;

FIG. 9B is a diagram showing the termination structure surrounding the optical waveguide according to the eighth embodiment of the present invention;

FIG. 12A is a diagram showing an example of a termination structure surrounding optical waveguides according to the eighth embodiment and ninth embodiment of the present invention;

FIG. 12B is a diagram showing the example of the termination structure surrounding the optical waveguides according to the eighth embodiment and ninth embodiment of the present invention;

FIG. 13A is a diagram schematically showing a waveguide device according to a tenth embodiment;

FIG. 13B is a diagram schematically showing the waveguide device according to the tenth embodiment;

DESCRIPTION OF EMBODIMENTS

Examples of the present invention will be described below with reference to the drawings. In the examples below, an optical device using a silica single-mode optical waveguide formed on a silicon substrate will be described. This is because this configuration is stable and easily appreciable of integration and is highly compatible with optical fibers, providing an optical device with a low propagation loss. However, the present invention is not limited to such a configuration.

Example 1

Figure 1:
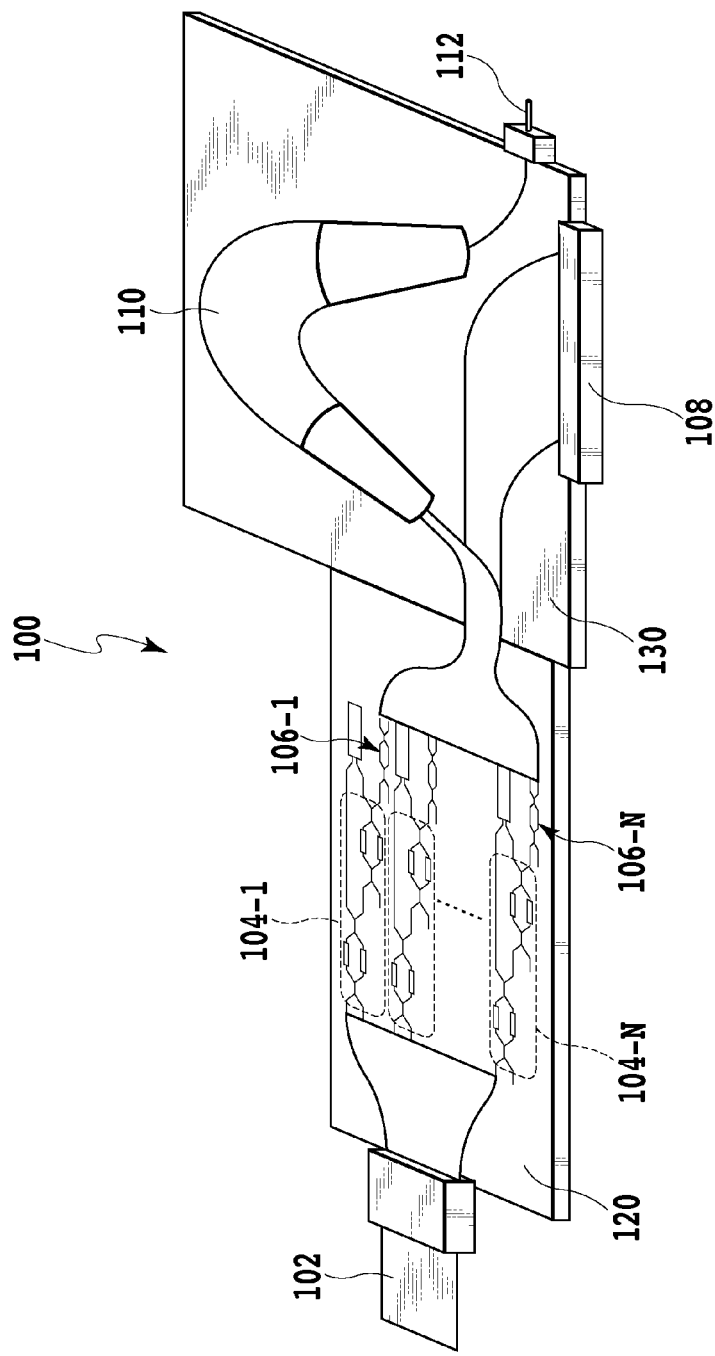
FIG. 1 is a diagram showing a configuration of a waveguide device according to a first embodiment of the present invention.

FIG. 1 is a diagram showing a configuration of a waveguide device according to an example of the present invention. As shown in FIG. 1, a device 100 includes a substrate 120 with VOAs 104-1 to 104-N and a substrate 130 connected to the substrate 120 and is with an arrayed waveguide grating (AWG) 110. The device 100 is configured as a wavelength multiplexing device with an optical level adjustment function (VMUX: VOA equipped MUX). The device is introduced into, for example, a WDM system. In the present configuration example, the VOAs 104-1 to 104-N and tapping optical couplers 106-1 to 106-N are integrated together in one substrate. An optical power monitor PD 108 and the AWG 110 are integrated together in another substrate 130.

Figure 2A:
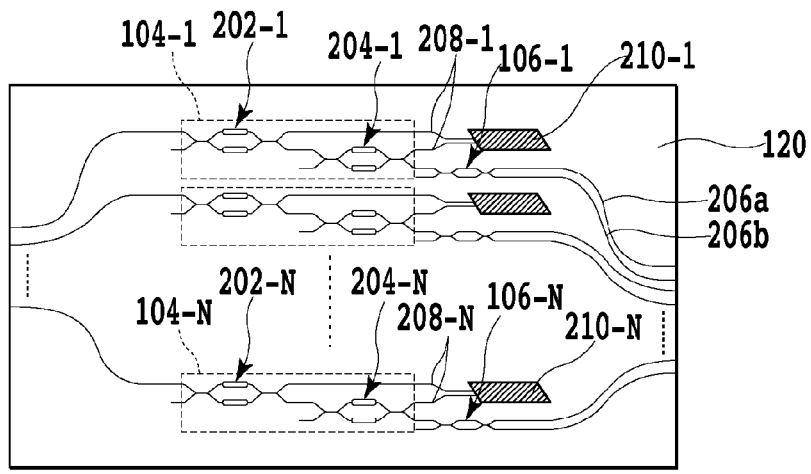
FIG. 2A is a diagram showing a circuit layout of a substrate with a variable optical attenuator in the waveguide device in FIG. 1.
Figure 2B:
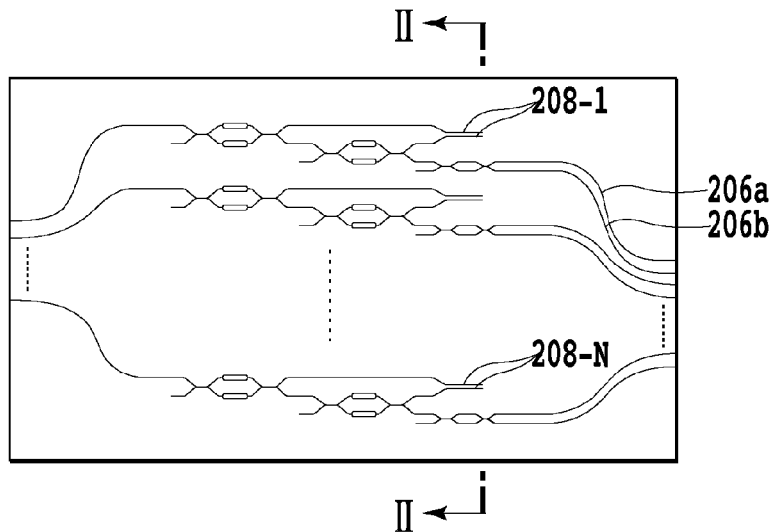
FIG. 2B is a diagram showing a circuit layout of a substrate with a variable optical attenuator in the waveguide device in FIG. 1.
Figure 2C:
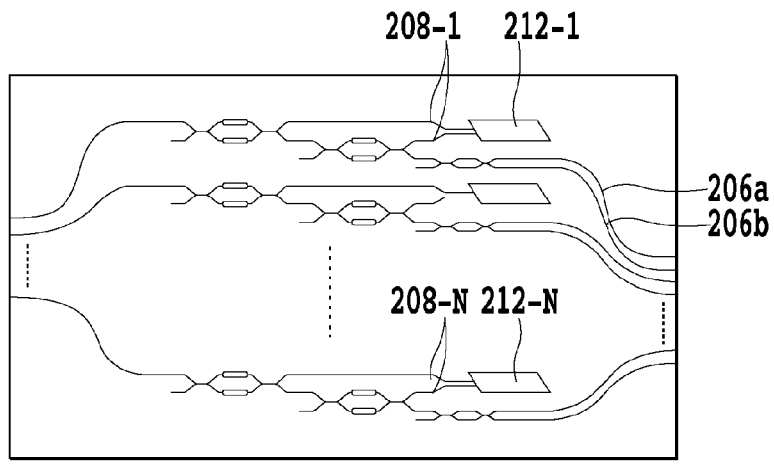
FIG. 2C is a diagram showing a circuit layout of a substrate with a variable optical attenuator in the waveguide device in FIG. 1.

FIG. 2A is a detailed circuit layout of the substrate 120 with the VOAs 104-1 to 104-N according to the present example. In FIG. 1 and FIGS. 2A to 2C, for simplification of drawing, only thin film heaters that drive the VOAs 104-1 to 104-N are shown, and electric wiring for providing electricity to the heaters and heat insulation grooves described below are omitted. In order to control the optical intensity levels of multiple channels simultaneously, the VOAs 104-1 to 104-N arranged in parallel are each formed of one of MZIs 202-1 to 202-N and a corresponding one of MZIs 204-1 to 204-N, with the two MZIs connected together in series. An attenuation operation is performed by applying power to both each of the MZIs 202-1 to 202-N and the corresponding one of the MZIs 204-1 to 204-N. Wavelength independent couplers (WINCs) are connected to output sides of the respective VOAs 104-1 to 104-N so as to function as tapping optical couplers 106-1 to 106-N. A main port 206a and a tap port 206b are led to an end of the substrate so as to connect to the AWG 110 and the PD 108 that monitors the optical power level of each channel; the AWG 110 and the PD 108 are integrated on another substrate 130. Unnecessary light guided from the MZIs 202-1 to 202-N and 204-1 to 204-N to dummy ports 208-1 to 208-N by the attenuation operation of the VOAs 104-1 to 104-N is further guided to termination structures 210-1 to 210-N each composed of a groove formed by removing a cladding layer and a core portion and a material (light blocking material) filled in the groove to attenuate the intensity of the light. The termination structures 210-1 to 210-N can be at any position on the substrate where on an extension of the dummy port. The light is thus attenuated and terminated to a sufficiently low level at which the light does not cause any crosstalk or stray light to other circuits or channels.

The light blocking material in the present example is made of carbon black mixed into a silicone resin as a base material. The carbon black is commonly used as a light blocking material. The optical power of light input into the light blocking material is attenuated mainly by absorption by the carbon black.

The substrate 120 including the VOAs 104-1 to 104-N is fabricated by such steps as described below. A single-mode optical waveguide made of silica glass including a cladding layer and an embedded core, is fabricated on a silicon substrate of 6-inch diameter by a combination of a reactive ion etching technique with a silica glass film deposition technique by utilizing a flame hydrolysis reaction of material gas such as $SiCl_4$ or $GeCl_4$. Thin film heaters and electrodes for providing electricity were fabricated on a surface of the cladding layer by vacuum deposition and patterning. In the optical waveguide fabricated, the core was normally 7 μm×7 μm in size, and the relative refractive index difference Δ between the core and the cladding layer was 0.75%.

A VOA and a WINC in Example 1 are formed by using such an optical waveguide and combining a linear waveguide with a curved waveguide. The thin film heaters formed on the surface of the cladding layer, which function as phase shifters based on thermooptic effects, were each 0.1 μm in thickness, 20 μm in width, and 2 mm in length. Moreover, heat insulation grooves were formed along the thin film heaters so that heat generated by the thin film heaters was efficiently transferred to the core of the optical waveguide. Simultaneously with the fabricating of the heat insulation grooves, grooves in the termination structures 210-1 to 210-N connected to dummy ports of the VOAs 104-1 to 104-N were formed. In the present example, each of the grooves was 100 μm in width and 1 mm in length. The bottom of the groove was deeper than the bottom of the core and may reach the substrate. An optical circuit in Example 1 including the VOAs 104-1 to 104-N formed using MZIs as basic elements and the WINCs 106-1 to 106-N had an overall length of 50 mm.

The difference in optical path length between the two arms of the MZIs 202-1 to 202-N and the MZIs 204-1 to 204-N composing VOAs 104-1 to 104-N was set equal to half the wavelength of signal light. Thus, when no electricity was provided to the VOAs 104-1 to 104-N, the signal light in the main path was blocked (maximum attenuation). In the present example, the VOAs are arranged in parallel in order to process WDM signals of the respective wavelength channels. However, for simplification of design, for all the VOAs, the optical path length difference was set to 0.75 μm, which is half of the center of a signal light waveband to be handled, 1.55 μm. However, it should be noted that strictly speaking, the optical path length difference corresponding to the passing wavelength may be set for each VOA.

The VOAs 104-1 to 104-N can set any attenuation by continuously varying the power applied to each of the thin film heaters. An extinction ratio is a performance defined by the difference between the state where the power of the optical signal in the main port is subjected to no attenuation (maximum optical output) and the state where the power of the maximum attenuation (optical output blocked). And the extinction ratio is normally often requested to be at least 50 dB. Since such a high extinction ratio can not be obtained if each of the VOAs 104-1 to 104-N is formed only of one MZI, in the present example, the VOA was formed of two MZIs connected in series, and the extinction ratio achieved was at least 55 dB.

In the present example, when the VOA provides the maximum attenuation, the maximum unnecessary optical power is guided to the dummy port. Without the appropriate termination structure of the dummy port, the unnecessary power may cause crosstalk to the succeeding WINC or to the AWG substrate 130 connected directly to the VOA substrate 120 and may result in a problem. For comparison with the circuit according to the present example (hereinafter referred to as Sample 1) shown in FIG. 2A, the following samples were simultaneously fabricated: a circuit without any termination structure for the dummy ports 208-1 to 208-N and in which the waveguide is only terminated at a position on the line II-II indicated in FIG. 2B (this circuit is hereinafter referred to as Sample 2), and a circuit including, as a termination structure, only grooves 212-1 to 212-N with no light blocking material inserted (this circuit is hereinafter referred to as Sample 3). For the samples fabricated in the present example, to observe the suppression of crosstalk by the termination structures 210-1 to 210-N for the dummy ports 208-1 to 208-N, the amount of crosstalk in the adjacent channel of the signal propagating channel was measured, when the attenuation of the VOA set to the maximum value (optical output blocked).

In Sample 2 with no grooves or light blocking materials for termination provided for the dummy ports 208-1 to 208-N, crosstalk of about −30 dB occurred in each of the main port 206a and tap port 206b of the adjacent channel. This indicates that, all of the unnecessary portion of the optical power which is guided to each of the dummy ports 208-1 to 208-N propagated in to a cladding mode at the end point of the dummy port and coupled to the waveguide in the adjacent channel, and then results in crosstalk.

Also in Sample 3 with the dummy ports 208-1 to 208-N terminated only by the grooves 212-1 to 212-N with no light blocking materials introduced therein, marked crosstalk of about −40 dB occurred in each of the main port 206a and tap port 206b of the adjacent channel. This indicates that, light radiated from the waveguide end face into each of the grooves 212-1 to 212-N is partly attenuated by reflection or scattering in the groove but propagates in the clad mode again and then couples to the adjacent waveguide, and then results in crosstalk.

On the other hand, in Sample 1 in which each of the dummy ports 208-1 to 208-N was terminated by the groove filled with the light blocking material, the adjacent channel crosstalk was less than −60 dB. This indicates that, the light blocking according to the present invention provided the appropriate termination with attenuating the unnecessary optical power to a sufficiently low level at which the other circuits were not affected.

Figure 3:
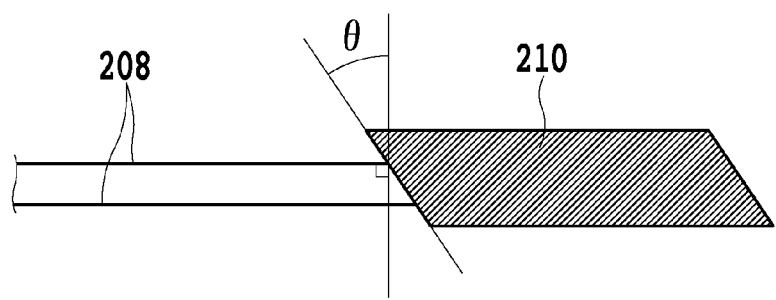
FIG. 3 is a diagram showing the shape, in a horizontal plane of a substrate, of a groove that terminates an optical waveguide according to a first embodiment of the present invention.

The groove of each of the termination structures 210-1 to 210-N in the present example is shaped such that the angle (θ) is 8 degrees as shown in FIG. 3. The angle is the incidence plane on the groove to the propagation direction in the terminated waveguide. The light blocking material in the present example, a mixture of a silicone resin and carbon black, has a refractive index almost equivalent to that of silica glass, but with a slight difference in refractive index taken into account, the angle (θ) was applied to the groove so that it did not affect the return loss of the VOA. Actually, the optimum angle (θ) should be determined with considering the refractive index of the light blocking material, a possible space for the termination structure to be arranged, fabrication accuracy for the groove, and the like. The return loss was measured at the input of each of the VOAs 104-1 to 104-N in Sample 1 fabricated in the present example. The measured value of the return loss was 50 dB, which indicates a favorable characteristic.

Example 2

Example 2 of the present invention used a configuration similar to that shown in FIG. 1 and FIG. 2A and in which the light blocking material provided at the terminal of each of the dummy ports 208-1 to 208-N for the VOAs 104-1 to 104-N was a mixture of a silicone resin as a base material and powder metal microparticles that are also used as a pigment. The optical power of light which inputs the light blocking material is attenuated by optical scattering caused mainly by the metal microparticles. The sample prepared was formed of a silica optical waveguide fabricated on a silicon substrate as is the case with Example 1 and included the termination structures 210-1 to 210-N each with a groove and the light blocking material which was introduced in order to prevent light from coupling to the adjacent waveguide and causing crosstalk. Also in the present example, the adjacent channel crosstalk had a value of at most −60 dB.

Furthermore, the angle of the incidence plane on the groove the terminated waveguide (the angle θ in FIG. 3) was set to 15 degrees with considering the refractive indices of the optical waveguide and the light blocking material. At this time, the value of the return loss measured at the input of each of the VOAs 104-1 to 104-N was at least 50 dB, which indicates a favorable characteristic.

Example 3

Example 3 of the present invention used a configuration similar to that in Example 2 and in which the angle of the incidence plane on the groove for the terminated waveguide (the angle θ in FIG. 3) was set equal to Brewster's angle. The other components and the light blocking material were similar to those in Example 2. The Brewster's angle in the present example was calculated to be about 50 degrees. By setting the angle of the incidence plane equal to the Brewster's angle, all the polarization components that are horizontal to the substrate are allowed to input into the light blocking material, and some of the polarization components that are vertical to the substrate are radiated into the waveguide substrate by reflection. Furthermore, equivalent effects are obtained with a near angle to the Brewster's angle or with an angle equal to or larger than the Brewster's angle. Thus, the adverse effect of crosstalk caused by radiated light is further reduced throughout the waveguide substrate. According to the present example, the adjacent channel crosstalk was at least −65 dB, and the return loss at the input of each of the VOAs 104-1 to 104-N was at least 55 dB. Furthermore, the present example is definitely applicable to a configuration other than that in Example 2, for example, to the configuration in Example 1. Thus, depending on the available space in the circuit in which the termination structure is arranged, unnecessary optical power can be more effectively terminated by setting the angle of incidence equal to the Brewster's angle as needed.

Example 4

Figure 4:
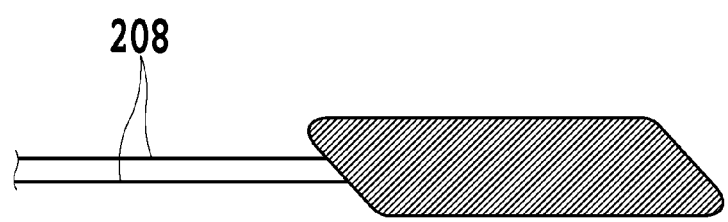
FIG. 4 is a diagram showing the shape, in a horizontal plane of a substrate, of a groove that terminates an optical waveguide according to a fourth embodiment of the present invention.

Example 4 of the present invention used a configuration similar to that in Example 2 and in which the groove terminating the dummy port 208 was shaped, in a plane that is horizontal to the substrate, by a closed curve composed of curves and straight lines smoothly connected and including no vertex. A light blocking material was inserted into the groove, as shown in FIG. 4. The light blocking material was a mixture of a silicone resin and carbon black. The sample fabricated included a smoothly formed groove wall surface, which made the light blocking material unlikely to be peeled off. This served to improve long-term reliability. Furthermore, the effect of crosstalk reduction in the present example is similar to that in Example 1. The adjacent channel crosstalk was at most −60 dB. Also in the present example, the incidence angle on the groove at the terminal was set to 8 degrees, and thus the return loss at the input of each of the VOAs 104-1 to 104-N was at least 50 dB.

Example 5

Figure 5A:
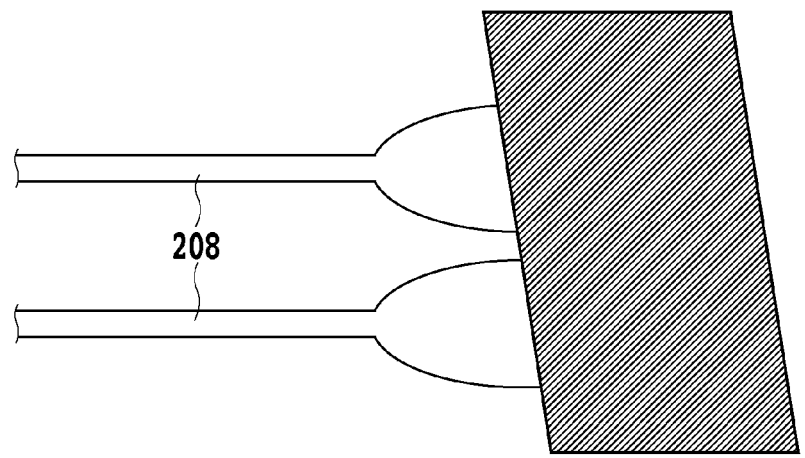
FIG. 5A is a diagram showing a taper shape of terminated optical waveguides according to a fifth embodiment of the present invention.
Figure 5B:
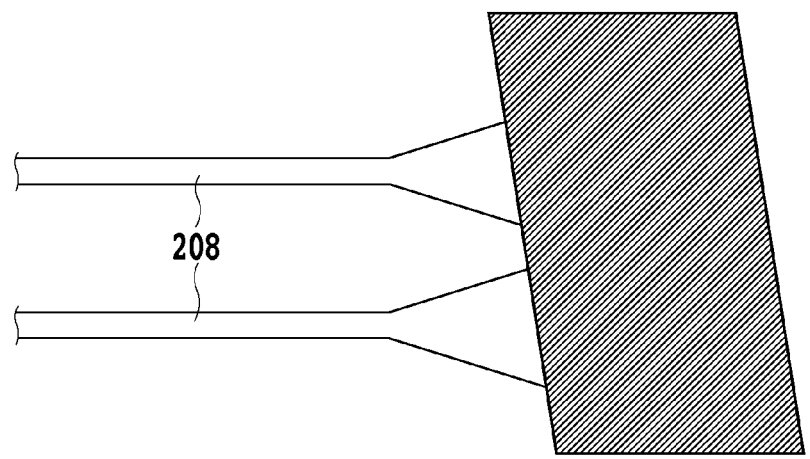
FIG. 5B is a diagram showing a taper shape of terminated optical waveguides according to the fifth embodiment of the present invention.

Example 5 of the present invention used a configuration similar to that in Example 1 and in which the optical waveguide was tapered at the terminal of the dummy port 208 as shown in FIG. 5A and FIG. 5B. This configuration is intended to reduce the power density of light entering the light blocking material by the increased mode field diameter of propagating light in the taper portion compared with that in the other portion of the optical waveguide, which has the normal width. For example, if the light blocking material absorbs light to attenuate the unnecessary optical power from the VOAs 104-1 to 104-N, the optical power is converted into heat to raise the temperature of the light blocking material. In this case, the increased power density causes the temperature to rise rapidly locally, possibly damaging the silicon resin, which is the base material of the light blocking material. In particular, optical devices in a node system for ROADM or the like may have a maximum rated input optical power of at least 200 mW (+23 dB). Thus, in one channel, the maximum unnecessary optical power guided to the VOA dummy port 208 (at the time of shutdown) is expected to be about 10 mW (+10 dBm). In this case, the temperature of the light blocking material may increase by more than 300 degrees depending on the incident mode field diameter. This causes the temperature of the light blocking material to exceed the allowable temperature range of the silicon resin.

In the present example, for two types of taper shapes, a parabolic shape shown in FIG. 5A and a linear shape shown in FIG. 5B, taper length and taper width (on the input side of the termination structure) were set to 100 µm and 30 µm, respectively. The light blocking material was a mixture of a silicon resin and carbon black, and the endurance of the light blocking material against to input power was observed. Then, it was found that for both shapes, the light blocking material had not been damaged under input power of 10 mW (+10 dBm). Specifically, the light blocking material was cut at a plane perpendicular to the direction of light incidence and the cross section was visually checked.

Evidently, the device in the present example sufficiently endures high power and is applicable to a note system.

The taper length and width in the present example are only illustrative. The numerical values of the taper length and width are determined by the positional relationship with adjacent waveguides and other circuits and spaces, and are not limited to those described in the present example. That is, the taper length can be set to any value between about several tens of µm and about several mm. Furthermore, the taper width can be reduced below the normal width of the optical waveguide to increase the mode field diameter. The taper width can be to any value between 0 µm and 30 µm so as to increase the mode field diameter.

Figure 6:
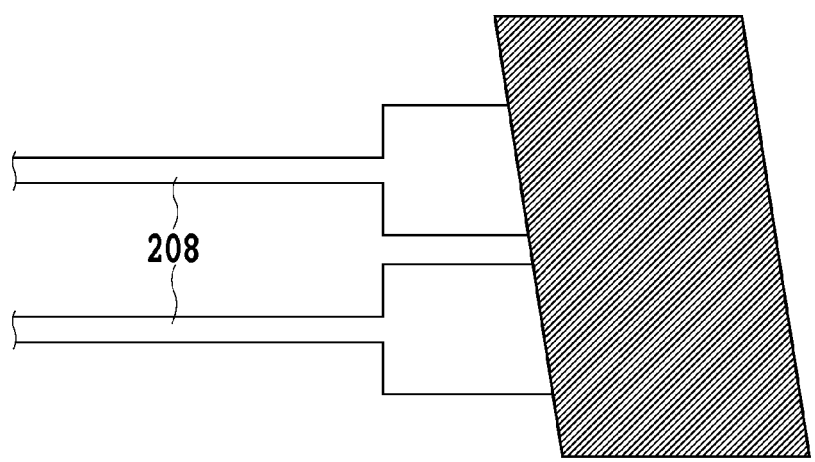
FIG. 6 is a diagram showing an MMI shape of terminated optical waveguides according to the fifth embodiment of the present invention.

Furthermore, the waveguide was shaped like a multimode interferometer at the terminal as shown in FIG. 6, and the endurance of the waveguide against to input power was similarly observed. Then, it was found that the light blocking material had not been damaged even by 10-mW (+10 dBm) input power when the interferometer was 100 µm in length and 30 µm in width.

Both devices with the respective shapes were expected to make similar effects in increasing the mode field diameter. Each of the devices was found to be sufficiently effective.

Example 6

Figure 7A:
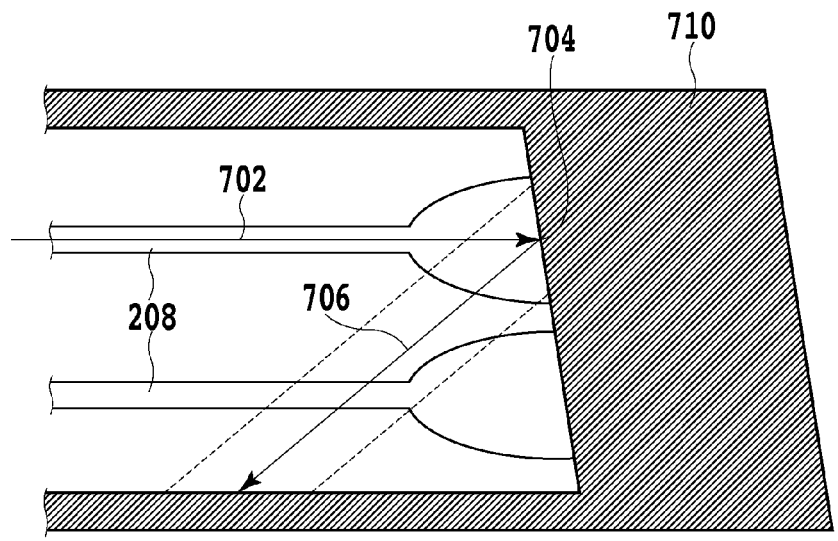
FIG. 7A is a diagram showing a termination structure surrounding optical waveguides according to a sixth embodiment of the present invention.

In Example 6 of the present invention, as shown in FIG. 7A, the terminated optical waveguides are arranged so as to be surrounded by a groove and a light blocking material in a horizontal plane to the substrate. This prevents reflected light at the terminal of the optical waveguides from affecting other circuits and the like. With a structure 710 configured to surround the terminated optical waveguides as shown in FIG. 7A. The incident light 702 is terminated at an end point 704 of the optical waveguides and partly causes reflected light 706 propagating through the substrate with a certain width (shown by a dotted line). In this case, the structure 710 is arranged so as to block the reflected light 706.

In Example 2 described above, the mixture of a silicon resin and powder metal microparticles was used as a light blocking material, and thus a certain level of reflected light caused by a difference in refractive index between the mixture and silica glass. However, since the angle of the incidence plane on the groove to the terminated optical waveguide was set to 15 degrees, most of the reflected light was radiated into the optical waveguide substrate without coupling to the terminated waveguide. In this case, for example, when the termination structure for the terminated optical waveguide was as shown in FIG. 3 or FIG. 4, FIG. 5A, FIG. 5B, or FIG. 6, the radiated reflected light was gradually attenuated and reached the end face of the substrate and was then radiated to the air without coupling to the optical fiber for input and output. Consequently, the reflected light posed no problem with circuit characteristics.

However, when in a waveguide device with a termination structure for an optical waveguide provided at any position, and when light receiving components such as monitor PDs are integrated together at the end face of the substrate or on the surface of the substrate, the reflected light at the termination structure can be received by the light receiving components and possibly cause crosstalk to be detected. This poses a problem with the circuit characteristics.

Thus, a waveguide device with a termination structure configured as shown in FIG. 7A was fabricated, and a mixture of a silicone resin and power metal microparticles was used as a light blocking material. When crosstalk were measured at every position on the substrate (end face and upper and lower surfaces) by using PDs, the measured value was equal to or less than −60 dB at all the positions compared with the intensity of light input to the terminated waveguide. Thus, the present configuration, compared to such a configuration as shown in FIG. 5A, may reduce the crosstalk by at least 10 dB, though the reduction depends on the configuration of or the position in the circuit.

Figure 7B:
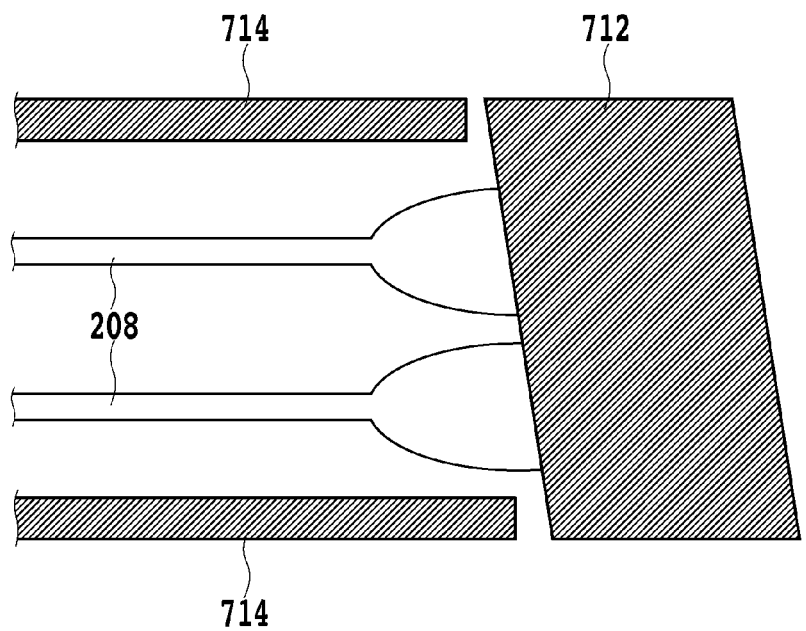
FIG. 7B is a diagram showing a termination structure surrounding optical waveguides according to the sixth embodiment of the present invention.

The configuration in the present example is intended to block reflected light, and thus the size, position, and shape of the configuration are optionally determined so as not to affect the arrangement of other circuits or the like. Furthermore, the portion that terminates the optical waveguide and the portion that blocks reflected light need not be shaped to be continuous. For example, the present invention exerts the same effects even using a shape such as the one shown in FIG. 7B and in which a structure 714 that blocks reflected light is graphically discontinuous with a termination structure 712 for the optical waveguide. In this case, the structures 712 and 714 may each be shaped by a closed curve formed only of smooth curves and straight lines and including no vertex and materials for the structures 712 and 714 may absorb or scatter light. In FIG. 7A and FIG. 7B, the waveguides are tapered. However, the waveguides may be differently shaped.

Example 7

Figure 8A:
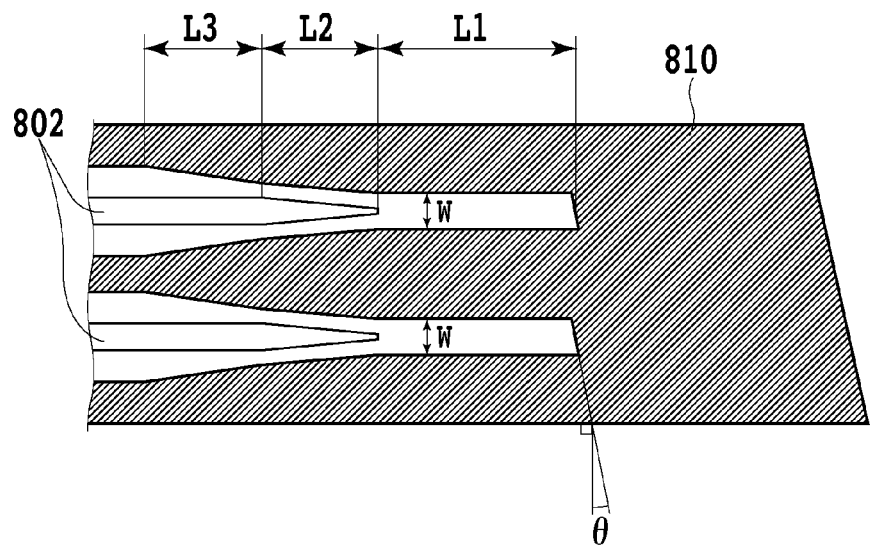
FIG. 8A is a diagram showing a termination structure surrounding optical waveguides according to a seventh embodiment of the present invention.
Figure 8B:
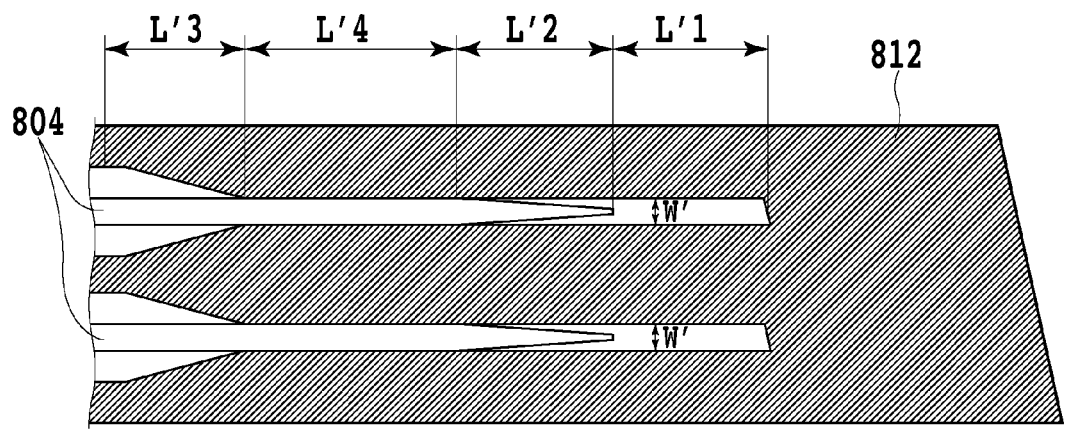
FIG. 8B is a diagram showing a termination structure surrounding optical waveguides according to the seventh embodiment of the present invention.

FIG. 8A and FIG. 8B are diagrams showing configurations according to Example 7 of the present invention. In Example 5, the configuration has been described which improves the endurance against to the high power of light input to the termination structure of the waveguide. However, the endurance was insufficient when input optical power of several tens of mW needed to be terminated.

Thus, a configuration that enables the high power endurance to be further improved is shown in FIG. 8A. In the present example, a terminated optical waveguide 802 has a linear taper structure in which the width of the waveguide decreases toward the terminal. A groove shape 810 with a light blocking material introduced therein as described in Example 6 surrounds the periphery of the waveguide. At the terminal position of the waveguide, the end point of the optical waveguide 802 and the termination structure 802 are connected together via a gap formed at a cladding layer and corresponding to a distance L1. The distance L1 is set so that light radiated from the terminal of the waveguide is sufficiently absorbed by the termination structure, and is set to, for example, at most 1 mm. In this case, the length L2 of the taper was set to 500 µm so as to increase the rate of change in waveguide width so that the spot size of light propagating through the waveguide was rapidly converted. Furthermore, the distance between the end point of the waveguide and the termination structure was set to 750 µm, and the incidence angle θ of light input to the termination structure was set to 15 degrees. The groove surrounding the terminated optical waveguide was shaped so as to gradually approach the optical waveguide in a portion L3 in FIG. 8A. In the linear taper portion, the groove is arranged in proximity to the waveguide so that the distance from the center of width of the optical waveguide to the groove is between half of the waveguide width (the groove contacts the sidewall of the waveguide core) and the waveguide width. The distance is set depending on a manufacturing error and the attenuation. In the present example, a distance L3 was set to 250 µm, and the distance from the center of the optical waveguide to the groove at the start position of the linear taper was set to 7 µm, which is the same as the waveguide width.

A sample configured as shown in FIG. 4 was fabricated. A light blocking material was used which was obtained by mixing a silicone resin with carbon black, and the endurance of the sample against to input power was observed. Then, it was found that the light blocking material had not been damaged under input power of 50 mW (+17 dBm).

In the configuration according to the present example, the spot size is rapidly converted at the linear taper, and radiated light is thus generated. Then, the light blocking material surrounding the periphery of the optical waveguide can attenuate the optical power partly. Furthermore, although most of the optical power with the mode field enlarged by the taper propagates over the optical waveguide, the optical power enters the termination structure at the terminal position via the gap formed of the cladding layer. Thus, the optical power is further distributed, and suppressing a resultant rapid increase in temperature inside the light blocking material.

The return loss measured at the input of each VOA in the configuration according to the present example was at least 55 dB. When crosstalk was measured at every position on the substrate by using PDs, the measured value was equal to or less than −60 dB at all the positions compared with the intensity of light input to the terminated waveguide.

In the present example, the taper of the optical waveguide is desirably shaped such that the waveguide width decreases toward the terminal. However, the waveguide width at the end point may be optionally set to be smaller than that in the normal portion of the waveguide (the entire waveguide except for the taper portion). Furthermore, the waveguide may be shaped such that two linear tapers are connected together by adopting two different types of width change rate in a linear taper shape with a gradually decreasing width. The use of an optical waveguide taper of such a shape is included in the scope of the present invention.

Additionally, for the gap between the end point of the optical waveguide and the termination structure which is formed of the cladding layer, the distance between the end point and the termination structure is adjusted according to the space arranged in the circuit and the power of incident light and is properly set to at most 1 mm. That is, the distance is set such that light radiated from the terminal of the waveguide is sufficiently absorbed by the termination structure. In contrary, the distance L1 in FIG. 8A may be 0 mm. In this case, the optical power may locally input to the termination structure, thus sufficient high power endurance may not be achieved. However, the purpose of terminating the optical waveguide and suppressing crosstalk can be accomplished as long as the light blocking material is not damaged.

The configuration shown in FIG. 8A was found to endure high power of several tens of mW, but for an input of higher power, for example, 100 mW (+20 dBm), the endurance with the configuration was insufficient depending on the type of the light blocking material. Thus, the configuration shown in FIG. 8B was used to further improve the high power endurance. That is, a groove 812 surrounding terminated optical waveguides 804 contacts the sidewall of core of each of the optical waveguides over a distance L'4. The distance L'4 reaches to the start point of the linear taper of the optical waveguide 804. The linear taper of the optical waveguide 804 is shaped to have a width decreasing toward the end point. Furthermore, as in the case of FIG. 8A, the end point of the optical waveguide 804 and the termination structure 812 are arranged with a gap between the end point and the termination structure 812 which is formed at the cladding layer. In the present example, a taper length L'2 was set to 500 μm, and a distance L'1 corresponding to the gap was also set to 500 μm. The width W' of the area sandwiched between the grooves contacting the side walls of the optical waveguide core was to be constant until the termination structure 812. In the present configuration, when the groove comes into contact with the optical waveguide 804, part of the power of propagating light is radiated in the groove and attenuated. Then, the field is enlarged toward the termination structure, and the remaining optical power is attenuated and terminated by the termination structure. Thus, the present configuration allows the optical power to be attenuated more slowly than the configurations described in Examples 1 to 6. A sample configured as shown in FIG. 8B was fabricated. A light blocking material was used which was obtained by mixing a silicone resin with carbon black, and the resistance of the sample to input power was observed. Then, it was found that the light blocking material had not been damaged under input power of 100 mW (+20 dBm). Additionally, the return loss measured on the input side was at least 55 dB. When crosstalk was measured at every position on the substrate by using PDs, the measured value was equal to or less than −60 dB at all the positions compared with the intensity of light input to the terminated waveguide. In the configuration shown in FIG. 8B, the width W' of the area sandwiched by the grooves was constant. However, endurance against the input power can be improved by shaping such that the groove contacts the side walls of the optical waveguide core at the linear taper portion. In addition, in order to avoid insufficient core pattern caused by a manufacturing error (positional displacement or a pattern shift) of the groove contacting the core side wall, a distance of about 1 to 5 μm of cladding layer can be set between the groove and the core side wall via the cladding layer to the extent to increase a propagation loss in the optical waveguide.

Example 8

In the waveguide device according to Example 7 of the present invention, the light blocking groove is desirably arranged in proximity to or in contact with the core so that the groove absorbs light propagating around the core to the terminal. In this arrangement, the light blocking groove is located along the taper. Thus, a manufacturing error in a groove 820 with a light blocking material filled therein may pose a problem as shown in FIG. 9. As shown in FIG. 9A, the end face of the termination structure is obliquely cut (at the angle θ) so that light radiated from a waveguide 822 does not return to the waveguide even when the light is reflected by the end face. However, if an obliquely cut groove is fabricated, the resulting groove is actually shaped to have rounded corners. When a positional displacement of a mask occurs during fabrication of the groove, light from the waveguide is input at the rounded end face. Then, part of the reflected light returns to the waveguide to reduce the return loss as shown in FIG. 9B.

Figure 10A:
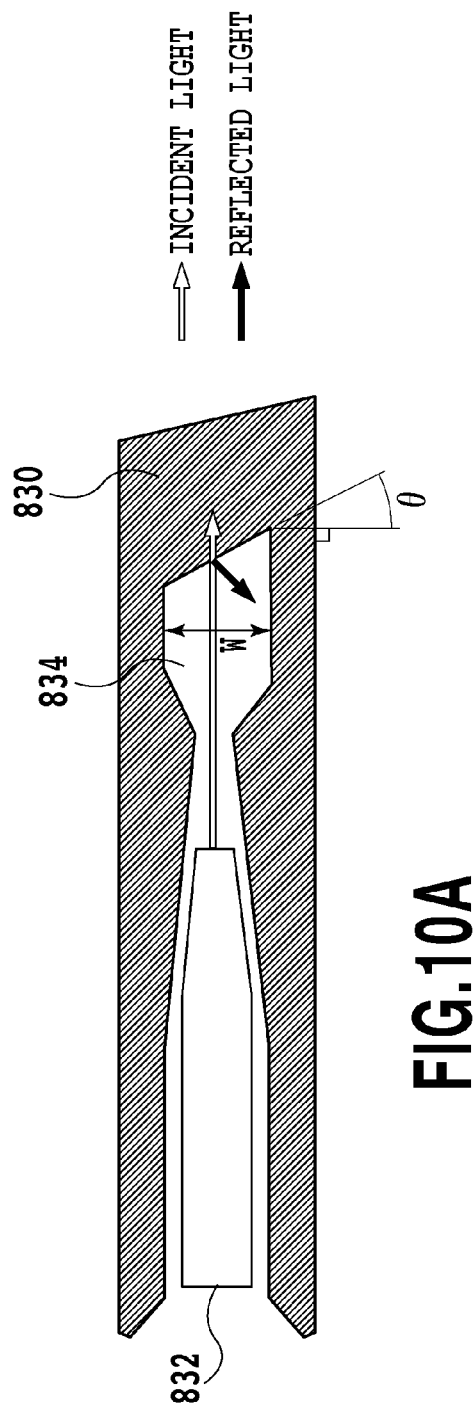
FIG. 10A is a diagram showing a termination structure surrounding an optical waveguide according to the eighth embodiment of the present invention.
Figure 10B:
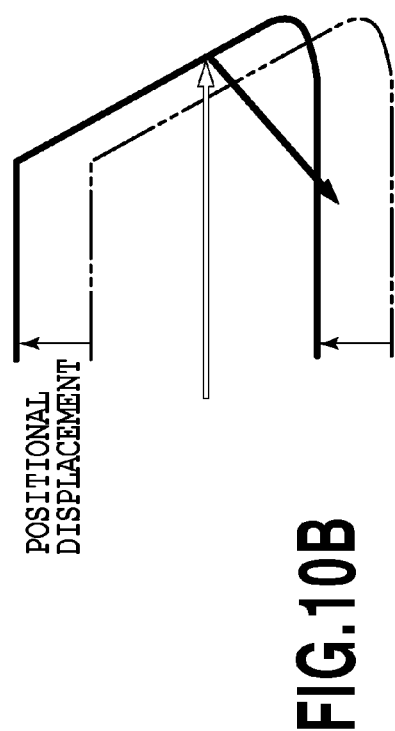
FIG. 10B is a diagram showing the termination structure surrounding the optical waveguide according to the eighth embodiment of the present invention.

Thus, as shown in FIG. 10A, a cladding portion 834 is enlarged around the end face of a termination structure 830 so that light from the waveguide 832 does not input to the rounded end face even if the mask is displaced. This reduces the light reflection to the waveguide 832, thus suppressing a decrease in return loss, as shown in FIG. 10B. As a result, tolerance in mask alignment and thus productivity are improved.

If the cladding portion is enlarged around the end of the termination structure, the following should be taken into account: the accuracy (a) of mask alignment (several μm), the width (b) over which the corner of the groove is rounded (about 5 to 10 μm), and the width (c) over which light radiated from the waveguide is diffracted and spread (10 to 20 μm; the width depends on the distance from the waveguide end to the end face of the termination structure). In this case, the width (w) over which is to be spread at the end face of the termination structure is w≥a+b+c/2.

Example 9

Figure 11A:
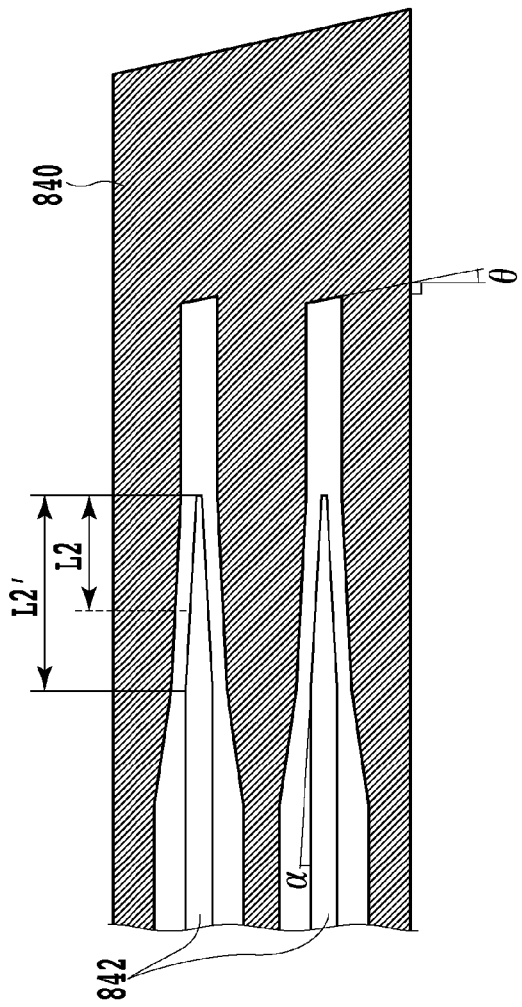
FIG. 11A is a diagram showing a taper structure for optical waveguides according to a ninth embodiment of the present invention.
Figure 11B:
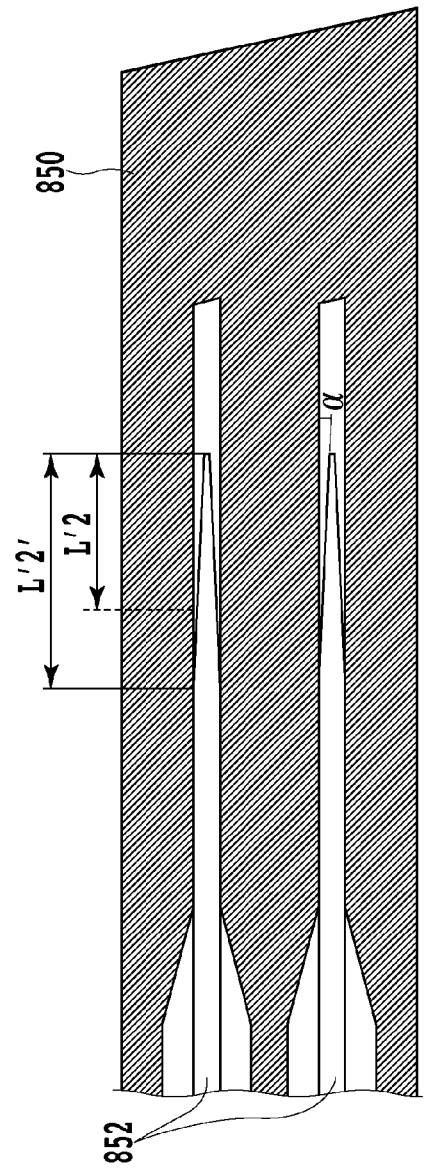
FIG. 11B is a diagram showing a taper structure for optical waveguides according to the ninth embodiment of the present invention.

As described above in conjunction with FIG. 8, the power of light entering the end face of each of the termination structures 810 and 812 can be reduced by increasing the rate of change in the waveguide width of the taper portion (L2) to cause light to be radiated from the taper portion (non-adiabatic transition structure). In this case, the power of the light radiated from the taper portion may damage the surrounding light blocking material. Thus, the damage by the radiated light from the taper portion can be avoided by increasing the distances L2 and L'2 in FIG. 8 to L2' and L'2', respectively, (that is, setting taper angle α equal to or smaller than a critical angle) to make the taper structure into an adiabatic transition structure, as shown in FIG. 11. A groove 840 in the termination structure is arranged in proximity to the core of each waveguide 842 as shown in FIG. 11A or a groove 850 in the termination structure is arranged in contact with the core of each waveguide 852 as shown in FIG. 11B. Then, light propagating around the core can be absorbed to reduce the power of light entering the end face of the termination structure. The critical angle of the taper serving as the adiabatic transition structure is about 0.3 degrees if specific refractive index Δ is 0.75%.

As described above, the adiabatic transition structure avoids light radiation from the taper portion. However, even if the taper angle α is equal to or larger than the critical angle, no practical problem occurs provided that damage at the light blocking material by light radiated from the taper portion is at low level enough to pose no problem.

FIG. 12 shows an example of this embodiment having a configuration with taper shape (α=0.3 degrees) providing adiabatic transition, in which a part of the cladding is enlarged around the end of the termination structure.

Example 10

FIG. 13a is a diagram showing a configuration of a waveguide device according to Example 10 of the present invention. In the device 900a, a waveguide device substrate 920a with a waveguide optical switch (not shown in the drawings), a VOA 902, and a WINC 904 integrated together thereon is connected directly to a waveguide device substrate 930 with an AWG and a monitor PD integrated together thereon, to provide the main functions of an ROADM system.

Figure 18:
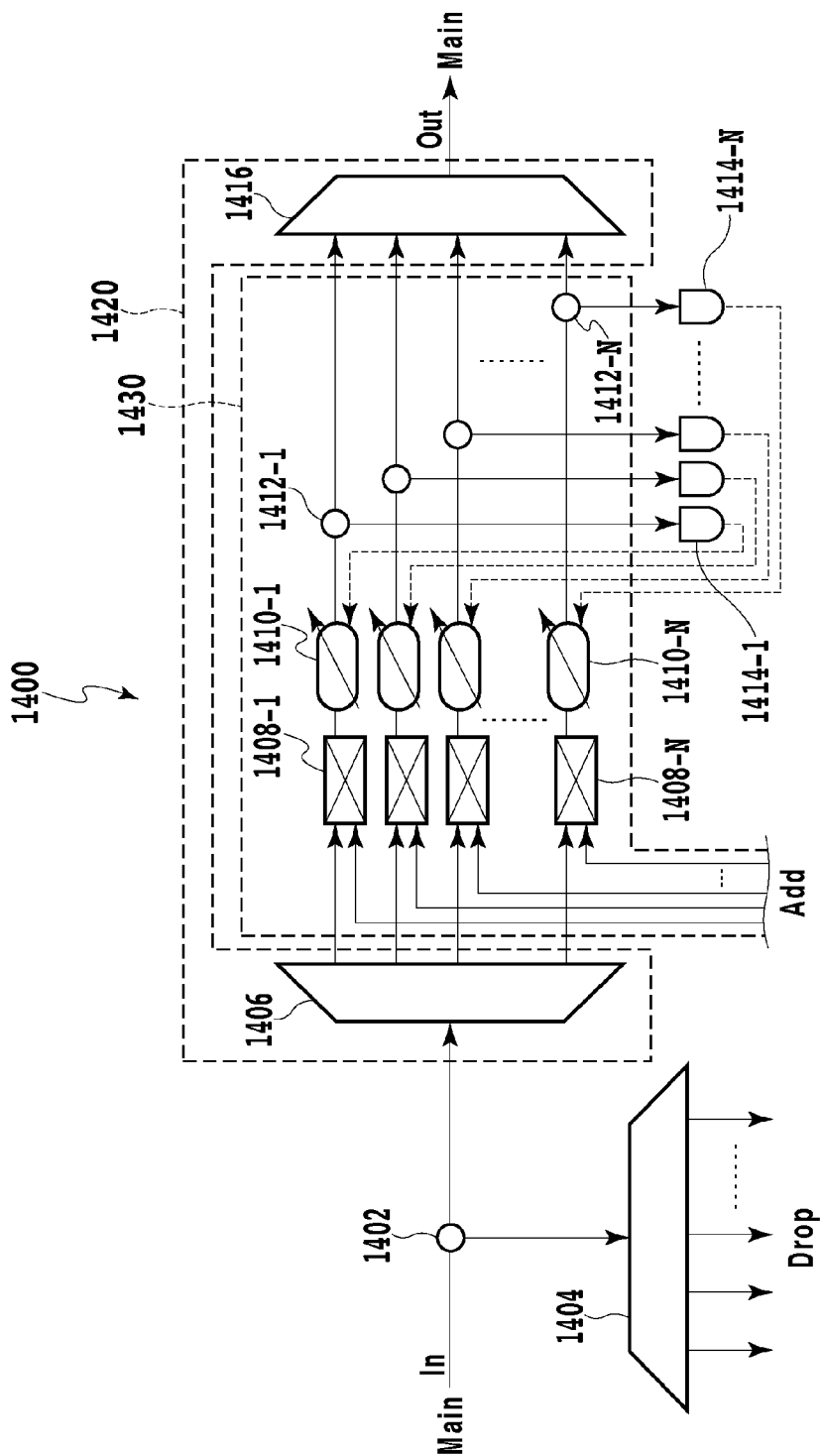
FIG. 18 is a circuit block diagram showing a configuration example of a module of waveguide devices implementing the main functions of an ROADM system.
Figure 19A:
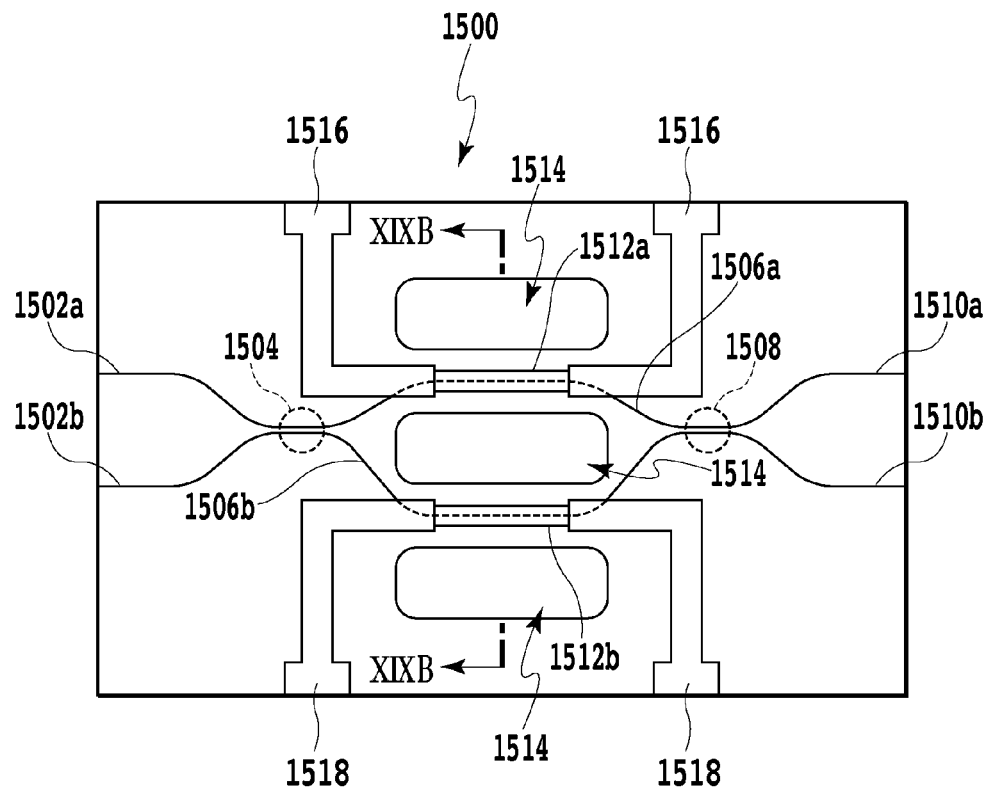
FIG. 19A is a diagram showing a basic configuration of a variable optical attenuator in the waveguide device.
Figure 19B:
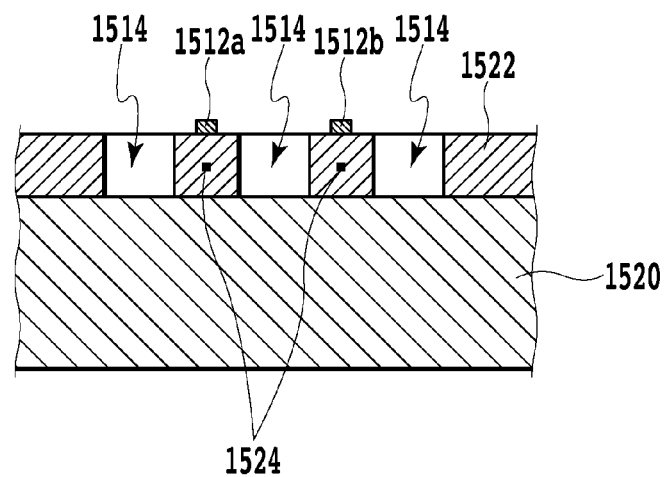
FIG. 19B is a cross-sectional view of the variable optical attenuator taken along line XIXB-XIXB in FIG. 19A.
Figure 20:
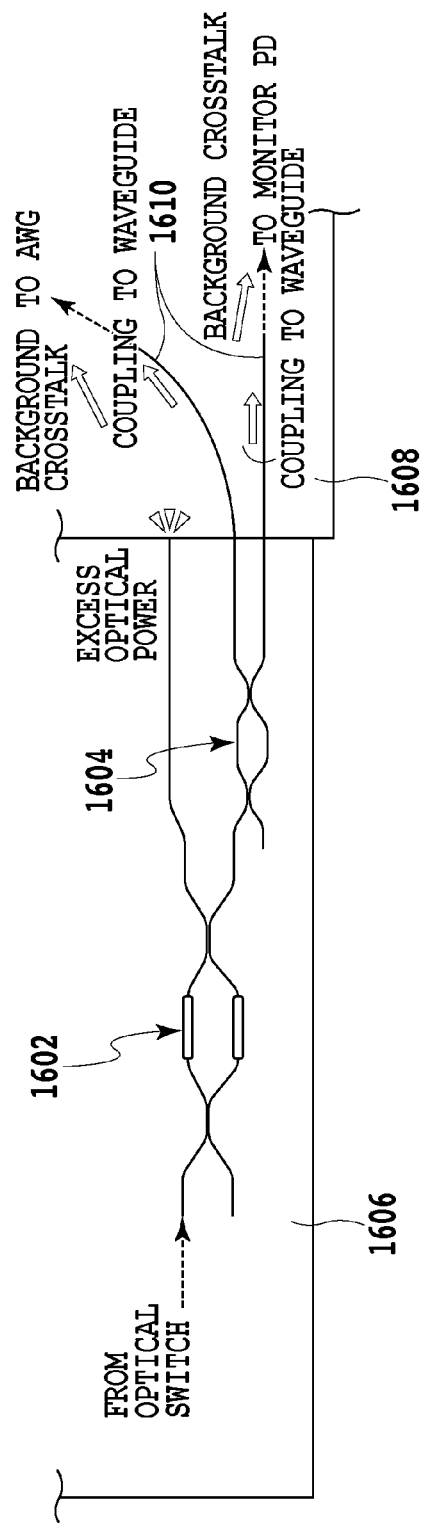
FIG. 20 is a diagram illustrating an unnecessary optical power problem in a waveguide device using a multichip integration technique according to the conventional art.

In the present example, a dummy port 906 for the VOA 902 is terminated by a termination structure 908a including a groove and a light blocking material. In FIG. 13, the optical switch, the AWG, and the monitor PD are not shown in detail. However, each of the optical switch and the AWG is configured using the same optical waveguide as that of the VOA, and the monitor PD is connected to the substrate end face. The optical switch has the functions of the 2×1 switches 1408-1 to 1408-N in FIG. 18 to select either a path for an optical signal came from DEMUX (wavelength demultiplexing) (main path) or a path for an optical signal inserted (added) by a lower layer network (add path). The selected optical signal has the optical level thereof adjusted by the VOA 902. The resultant signal is connected to the MUX (wavelength multiplexing) AWG via the WINC 904.

In this case, an epoxy resin and carbon black were used as a light blocking material for the termination structure 908a that terminates the dummy port 906 for the VOA. When crosstalk in each of the AWG and monitor PD connected to an output side of the WINC 904 was measured, the measured value was at most −60 dB for both in AWG and monitor PD. Here, in FIG. 13A, the incidence angle of the plane on the termination structure 908a to the optical waveguide was 0 degree. However, in this case, the return loss measured on the input side of the optical switch was at least 45 dB. When the incidence angle of the plane on the termination structure 908b was set to 8 degrees, as shown in FIG. 13B, for comparison, the return loss was at least 50 dB. If the light blocking material (mixture) has a refractive index close to that of silica glass as in the case of Example 1 or the present example, a sufficient return loss characteristic can be achieved even if the incidence angle of the plane is set to zero degree with considering the size of the groove in a horizontal plane of the substrate. However, if a superior specification is desired, a configuration is required in which reflected light is prevented from coupling to the terminated optical waveguide. In this case, the Brewster's angle or the like is optimum.

Both in FIG. 13A and in FIG. 13B, when the groove in a horizontal plane of the substrate was formed of a curve and a straight line smoothly connected together so as not to have any vertex, the light blocking material did not peel off from the groove wall surface. Thus, long-term reliability was confirmed.

Figure 14A:
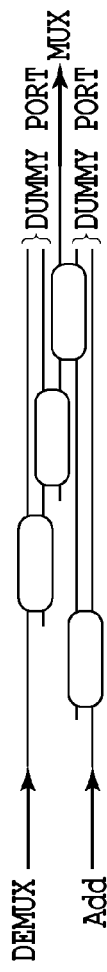
FIG. 14A is a diagram showing a specific configuration example in which a 2×1 optical switch is implemented by a waveguide device.
Figure 14B:
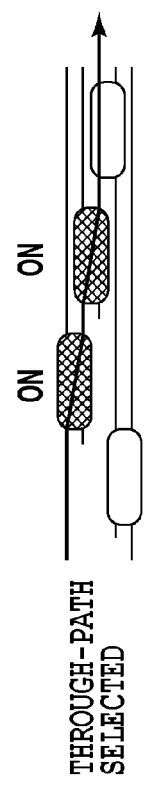
FIG. 14B is a diagram showing the specific configuration example in which the 2×1 optical switch is implemented by the waveguide device.
Figure 14C:
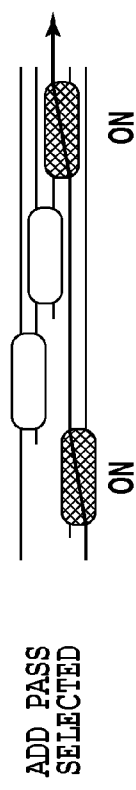
FIG. 14C is a diagram showing the specific configuration example in which the 2×1 optical switch is implemented by the waveguide device.

FIG. 13A shows the optical switch and the VOA 902 as separate circuits. However, the functions of the optical switch and the VOA may be simultaneously implemented using the same MZI. The configuration shown in FIG. 13A is not a limited configuration according the present invention. For configuration examples of the ROADM optical switch and the VOA, Patent Document 1 or Non-Patent Document 1 may be referenced. According to Non-Patent Document, as shown in conceptual drawings in FIG. 14A to FIG. 14C, optical switches both in a through-path-side and an add path-side are formed of two MZIs directly connected together. In this configuration, the optical level can be simultaneously adjusted by selecting one of the paths, while simultaneously driving the two MZIs with continuous applied power. In this case, dummy ports extending from the MZIs can be terminated individually or together by the termination structure including the groove and the light blocking material according to the present invention, thus avoiding that unnecessary optical power affects other circuits.

Example 11

Figure 15:
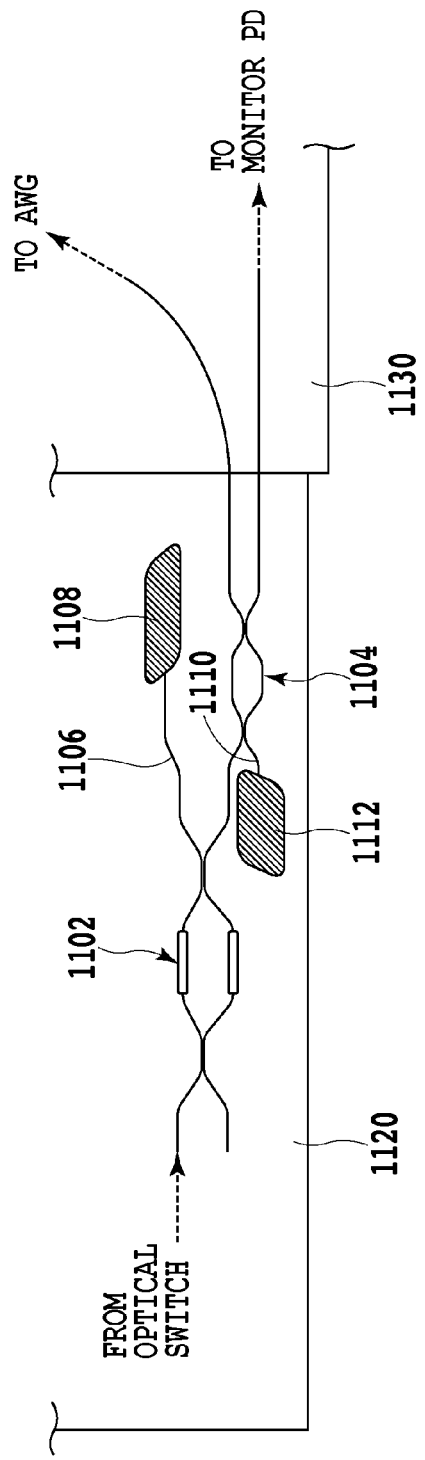
FIG. 15 is a diagram schematically showing a waveguide device according to an eleventh embodiment of the present invention.

FIG. 15 is a diagram showing a configuration of a waveguide device according to Example 11 of the present invention. As is the case with Example 10, in this device, a waveguide device substrate 1120 with a waveguide optical switch, a VOA 1102, and a WINC 1104 integrated together thereon is connected directly to a waveguide device substrate 1130 with an AWG and a monitor PD integrated together thereon, to provide the main functions of an ROADM system.

In the present example, a dummy port 1106 for the VOA 1102 is terminated by a termination structure 1108 including a groove and a light blocking material. Furthermore, an input-side dummy port 1110 for the WINC 1104 is terminated by a termination structure 1108 including a groove and a light blocking material. In the present example, the light blocking material was a mixture of a silicone resin as a base material and powder metal particles. Additionally, the incidence angle on the groove was (θ=) 22.5 degrees. According to the present example, crosstalk to other optical circuits caused by unnecessary optical power resulting from an attenuation operation and guided to the dummy port for the VOA can be suppressed. Moreover, the following can be avoided, which is caused by crosstalk coupling to the input-side dummy port 1110. The crosstalk was generated by the following two causes. One is crosstalk as a result of a connection loss at an input portion of the waveguide device substrate 1120 generated by connecting to another waveguide device or an optical fiber. The other is crosstalk resulting from an excess loss occurring on the optical waveguide through the optical switch and the VOA 1102. In a conventional configuration that does not include the termination structure 1112 for the input-side dummy port 1110 for the WINC, crosstalk occurring in an optical fiber connection portion or in the optical switch or the VOA 1102 may cause a coupling rate error of several percents for the WINC. This leads to a problem with feedback control performed by the monitor PD.

Thus, when an error in the coupling rate set for the WINC according to the configuration in the present example was measured, the measured value was ±0.5% in terms of the coupling rate. This indicates that, according to present invention, the adverse effect of crosstalk on the WINC was sufficiently suppressed.

The effect of crosstalk suppression by the termination structure 1108 for the dummy port 1106 for the VOA 1102 was also confirmed, and crosstalk measured at most −60 dB at any positions. Moreover, the return loss on the input side of the optical switch similarly measured at least 50 dB.

The termination of the input-side dummy port in the present example is not limited to the WINC. In any optical circuits with a dummy port provided on the input side thereof, for example, an optical switch and a VOA that use an MZI as a basic element, the adverse effects of crosstalk and the like can be similarly suppressed by terminating the input-side dummy port.

Example 12

In the present example, a case will be described in which a termination structure for an optical waveguide is applied at any position on a substrate not in the above-described optical switches and VOAs but in different waveguide devices.

Figure 16:
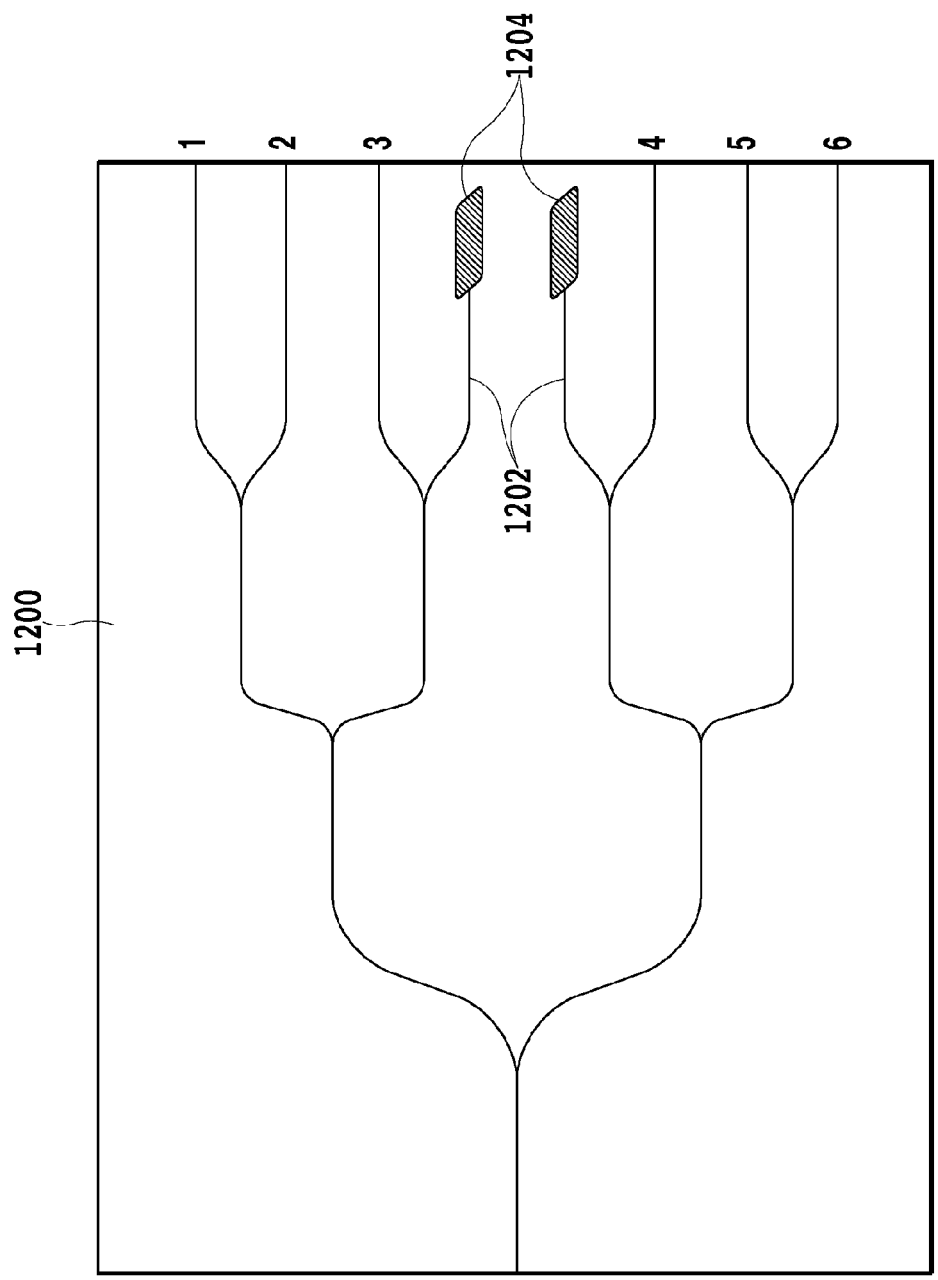
FIG. 16 is a diagram showing a configuration example of a 1×6 splitter according to a twelfth embodiment of the present invention.

FIG. 16 shows an example of an optical splitter. The configuration shown in FIG. 16 is used as, for example, means for implementing a 1×6 splitter. In this case, a 1×8 splitter 1200 is used as a basic configuration, and a termination structure 1204 according to the present invention is applied to two optical waveguides 1202 not used as output ports. This can suppress crosstalk to other output ports. In the present example, optical waveguides formed of silica glass were fabricated on a silicon substrate and used to produce a 1×6 splitter based on the configuration shown in FIG. 16. When an optical spectrum of a wavelength range from 1,300 nm to 1,650 nm was measured for each output port (1 to 6 in FIG. 16), a deviation in output power among the ports was about 0.5 dB over the entire wavelength range. This indicates a favorable characteristic.

Figure 17A:
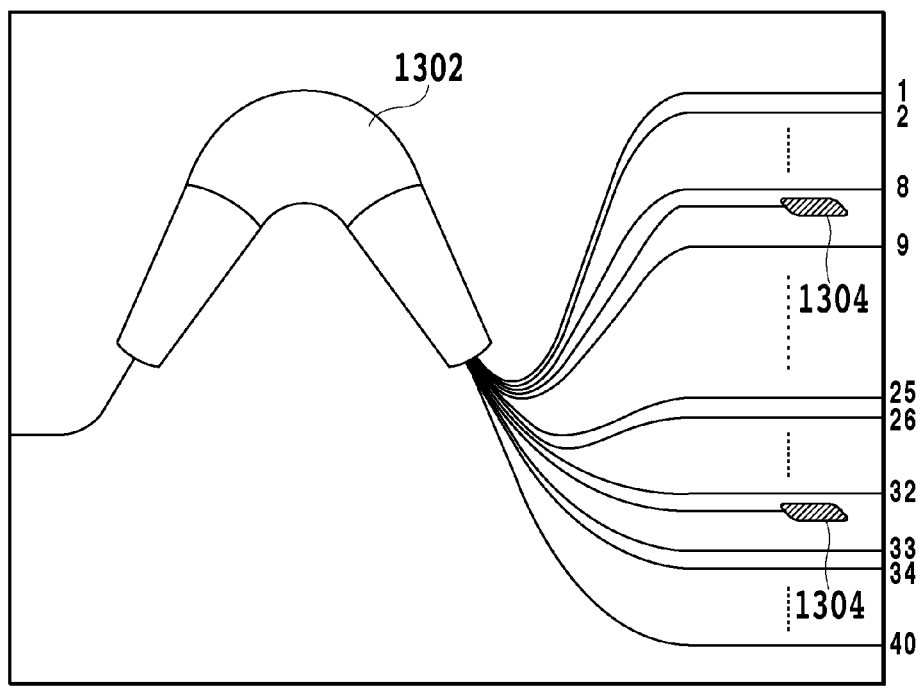
FIG. 17A is a diagram showing a configuration example of a 1×40 wavelength group multi/demultiplexing filter according to a twelfth embodiment of the present invention.
Figure 17B:
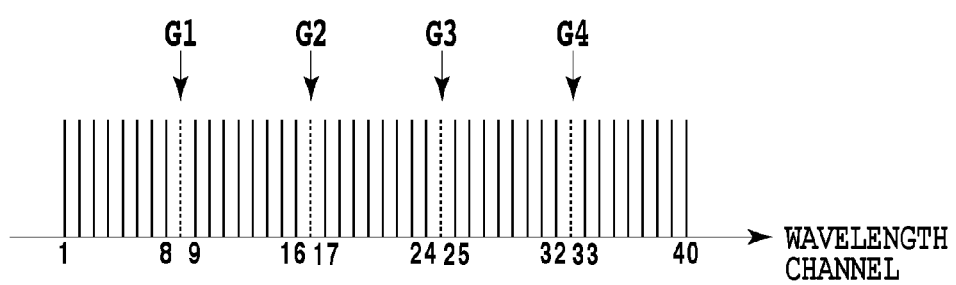
FIG. 17B is a diagram showing an example of transmission spectrum of the 1×40 wavelength group multi/demultiplexing filter according to the twelfth embodiment of the present invention.

FIG. 17A shows an example of an AWG. For example, in an AWG 1302 with one input and N outputs (N is a natural number), the following signal processing is possible. Output-side waveguides are terminated at intervals each corresponding to a given number of output ports by respective termination structures 1304 according to the present invention to separate an optical signal into wavelength groups. The wavelength groups are separated from one another by an ITU grid so that one of the ITU grids G1 to G4 is sandwiched between two wavelength groups (see FIG. 17B). In the present example, polymer waveguides fabricated on a silicon substrate were used to fabricate an AWG substrate based on the configuration shown in FIG. 17A. The AWG 1302 in the present example is configured to separate an optical signal into five wavelength groups composed of eight wavelengths. For one input waveguide, 44 optical waveguides are arranged on the output side. With every eight optical waveguides, one waveguide is terminated to separate the wavelength groups from one another. The total number of wavelengths which are each sandwiched between two wavelength groups is four (these wavelengths are terminated). In any case, crosstalk measured at most −40 dB in all the ports other than the terminated ones.

In Examples 1 to 12 of the present invention, waveguide devices formed of silica glass and a polymer material have been described. However, the present invention is applicable to all waveguide-type thermooptic circuits formed of other materials for use in forming waveguide devices, for example, ion-exchanged lithium nyobate waveguides.

Furthermore, for the grooves that terminate the optical waveguides, the depth of the groove has not particularly been referred to. However, for example, in waveguide devices fabricated on a silicon substrate using silica glass, the depth is preferably such that the groove reaches the silicon substrate. However, the present invention is also definitely effective even when the depth is optionally determined with considering fabrication conditions, adverse effects on the other circuits, and the like. As is obvious, the minimum required depth is such that the core is exposed from the wall surface of the groove at the terminal of the waveguide, but otherwise the configuration of the present invention is not limited to a particular depth.

100 Waveguide device
102 Optical fiber array
104-1 to 104-N VOAs
106-1 to 106-N Optical couplers
108 PD
110 AWD
112 Optical fiber
120 Substrate
130 Substrate
202-1 to 202-N MZIs
204-1 to 204-N MZIs
206a Main port
206b Tap port
208-1 to 208-N Dummy ports
210-1 to 210-N Termination structures
702 Incident light
704 End point
706 Reflected light
710 Termination structure
712 Termination structure
714 Structure
802 Optical waveguide
804 Optical waveguide
810 Termination structure
812 Termination structure
820 Termination structure
822 Optical waveguide
830 Termination structure
832 Optical waveguide
834 Enlarged cladding portion
840 Termination structure
842 Optical waveguide
850 Termination structure
852 Optical waveguide
900a, 900b Waveguide device
902 VOA
904 WINC
906 Dummy port
908a, 908b Termination structures
920a, 920b Substrates
930 Substrate
1102 VOA
1104 WINC
1106 Dummy port
1108 Termination structure
1110 Dummy port
1112 Termination structure
1120 Substrate
1130 Substrate
1200 1×8 splitter
1202 Optical waveguide
1204 Termination structure
1302 AWG
1304 Termination structure
1400 Module
1402 Optical coupler
1404 Wavelength multiplexing/demultiplexing filter
1406 Wavelength multiplexing/demultiplexing filter
1408-1 to 1408-N Optical switches
1410-1 to 1410-N VOAs
1412-1 to 1412-N Optical switches
1414-1 to 1414-N PDs
1416 Wavelength multiplexing/demultiplexing filter
1420 Substrate
1430 Substrate
1500 VOA
1502a, 1502b Ports
1504 Directional coupler
1506a, 1506b Arm waveguides
1508 Directional coupler
1510a, 1510b Ports
1512a, 1512b Thin film heaters
1514 Heat insulation groove
1516 Electrode pad
1518 Electrode pad
1520 Silicon substrate
1522 Cladding
1524 Core
1602 VOA
1604 Optical coupler
1606 Substrate
1608 Substrate
1610 Optical substrate

The invention claimed is:

1. A waveguide device, comprising:
a termination structure comprised of a light blocking material, the light blocking material bounding a passageway extending longitudinally thereinto to an end face;
a waveguide having a terminal end comprising a taper portion with a waveguide width decreasing toward a terminal point, the taper portion having a taper angle that is substantially equal to or smaller than a critical angle at which adiabatic transition occurs, the terminal end of the waveguide being positioned within the passageway, a gap being formed by the passageway longitudinally between the terminal point of the waveguide and the end face of the passageway;

wherein light from the waveguide enters the light blocking material through the end face of the passageway at an oblique incidence angle, and wherein a width of the passageway is constant at least in a region corresponding to the taper portion of the waveguide.

2. The waveguide device according to claim 1, wherein the angle of incidence is substantially equal to or larger than a Brewster's angle.

3. The waveguide device according to claim 1 wherein the light blocking material comprises a material that absorbs or scatters light from the terminal end of the waveguide.

4. The waveguide device according to claim 1, comprising: at least one of a Mach Zehnder optical switch, a variable attenuator, an optical splitter, and an arrayed waveguide grating.

5. A module obtained by multichip integration using waveguide devices according to claim 1.

6. The waveguide device recited in claim 1, wherein the end face is planar.

7. A waveguide device, comprising:
a termination structure comprised of a light blocking material, the light blocking material bounding a passageway extending longitudinally thereinto to an end face;
a waveguide having a terminal end comprising a taper portion with a waveguide width decreasing toward a terminal point, the taper portion having a taper angle that is substantially equal to or smaller than a critical angle at which adiabatic transition occurs, the terminal end of the waveguide being positioned within the passageway, a gap being formed at a cladding layer by the passageway longitudinally between the terminal point of the waveguide and the end face of the passageway;

wherein light from the waveguide enters the light blocking material through the end face of the passageway at an oblique incidence angle; and wherein a width of the passageway is constant at least in a region corresponding to the taper portion of the waveguide.

8. The waveguide device according to claim 7, wherein the angle of incidence is substantially equal to or larger than a Brewster's angle.

9. The waveguide device according to claim 7, wherein the light blocking material comprises a material that absorbs or scatters light from the terminal end of the waveguide.

10. The waveguide device according to claim 7, comprising: at least one of a Mach Zehnder optical switch, a variable attenuator, an optical splitter, and an arrayed waveguide grating.

11. A module obtained by multichip integration using waveguide devices according to claim 7.

12. The waveguide device recited in claim 7, wherein the end face is planar.

* * * * *